(12) United States Patent
Yasui et al.

(10) Patent No.: US 6,401,451 B1
(45) Date of Patent: Jun. 11, 2002

(54) DEGRADATION DISCRIMINATION SYSTEM OF INTERNAL COMBUSTION ENGINE EXHAUST GAS PURIFICATION SYSTEM

(75) Inventors: Yuji Yasui; Yushihisa Iwaki; Tadashi Satoh; Masahiro Satoh, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/551,210

(22) Filed: Apr. 17, 2000

(30) Foreign Application Priority Data

Apr. 16, 1999 (JP) .......................................... 11-109451

(51) Int. Cl.[7] ................................................ F01N 3/00
(52) U.S. Cl. ............................. 60/277; 60/274; 60/287; 60/297; 60/324
(58) Field of Search .......................... 60/274, 277, 287, 60/288, 292, 297, 278, 285, 299, 300, 324

(56) References Cited

U.S. PATENT DOCUMENTS

| | | | |
|---|---|---|---|
| 5,398,503 A | * | 3/1995 | Danno et al. ................. 60/288 |
| 5,524,433 A | * | 6/1996 | Adamczyk, Jr. et al. ....... 60/276 |
| 5,634,332 A | * | 6/1997 | Tanaka et al. ................. 60/284 |
| 5,647,206 A | * | 7/1997 | Yamamoto et al. ........... 60/297 |
| 5,765,369 A | * | 6/1998 | Tanaka et al. ................. 60/277 |
| 5,956,947 A | * | 9/1999 | Tanaka et al. ................. 60/297 |
| 6,012,284 A | * | 1/2000 | Tanaka et al. ................. 60/297 |
| 6,089,014 A | * | 7/2000 | Day et al. ...................... 60/274 |

FOREIGN PATENT DOCUMENTS

| | | |
|---|---|---|
| JP | 08-093458 | 4/1996 |
| JP | 08-218850 | 8/1996 |
| JP | 10-330718 | 11/1998 |

* cited by examiner

Primary Examiner—Thomas Denion
Assistant Examiner—Binh Tran
(74) Attorney, Agent, or Firm—Arent Fox Kintner Plotkin & Kahn, PLLC

(57) ABSTRACT

A system for discriminating degradation of an exhaust purification system of an internal combustion engine having an adsorbent installed at a bypass exhaust gas passage branched from an exhaust pipe of the engine, which is opened by a switch-over valve at starting of the engine to introduce the exhaust gas such that the adsorbent adsorbs unburned HC in exhaust gas generated by the engine and is closed such that the adsorbent desorbs the adsorbed HC and the desorbed HC is thereafter recirculated at a position upstream of a catalyst. Based on the fact, due to the adsorption effect, the HC concentration at a downstream point is lower than that at an upstream point, in the system, the concentration of the HC introduced in the bypass exhaust gas passage in the adsorption mode is detected and compared with a threshold value and the degradation of the adsorbent is discriminated, thereby enabling to improve the discrimination accurately.

25 Claims, 28 Drawing Sheets

FIG.5

| ZEOLITES | PORE SIZE | C2H6 ETHANE | C3H8 PROPANE | C5H12 PENTANE | C7H8 TOLUENE | C8H18 ISOOCTANE |
|---|---|---|---|---|---|---|
| ZSM-5 Ga-MFI [Ag/P-ZSM-5] | | ✗ | △ | ○ | △ | ✗ |
| MORDENITE | | ✗ | ✗ | △ | ○ | ○ |
| Y-TYPE | | ✗ | ✗ | ✗ | △ | ○ |

HC ADSORPTION

ADSORBENT TEMPERATURE RISING

HC DESORBING AND PURGING

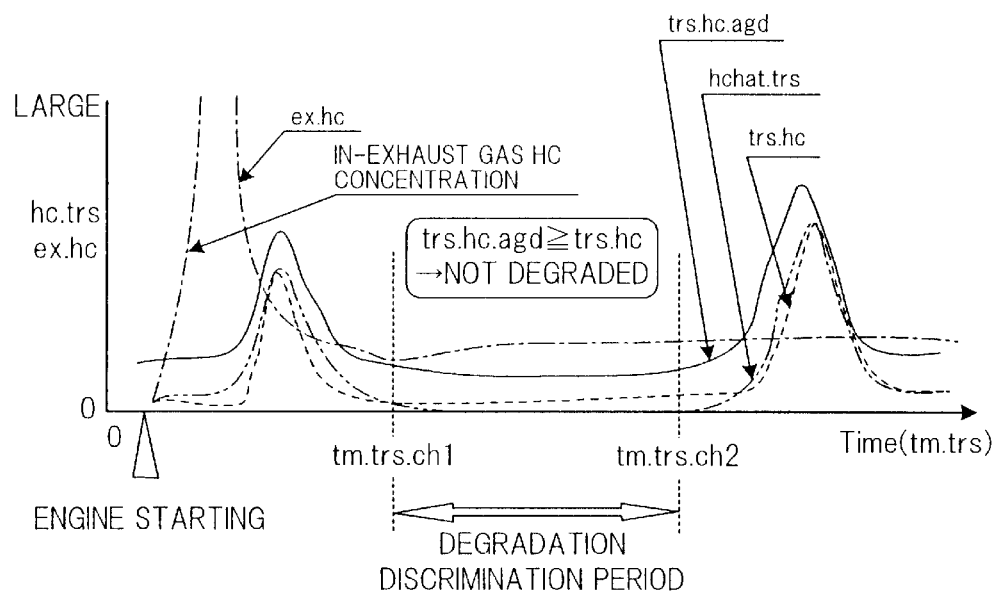
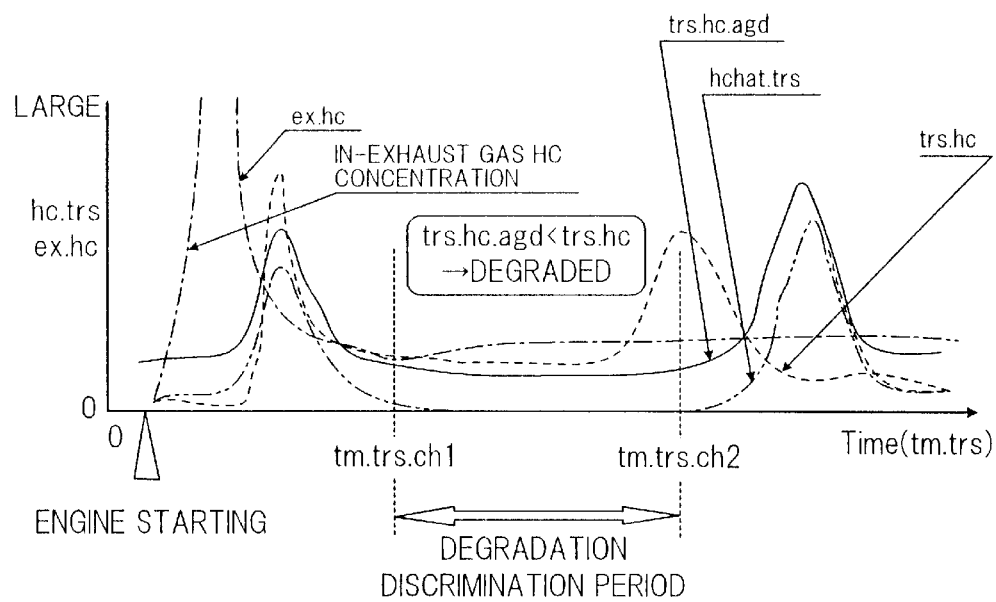

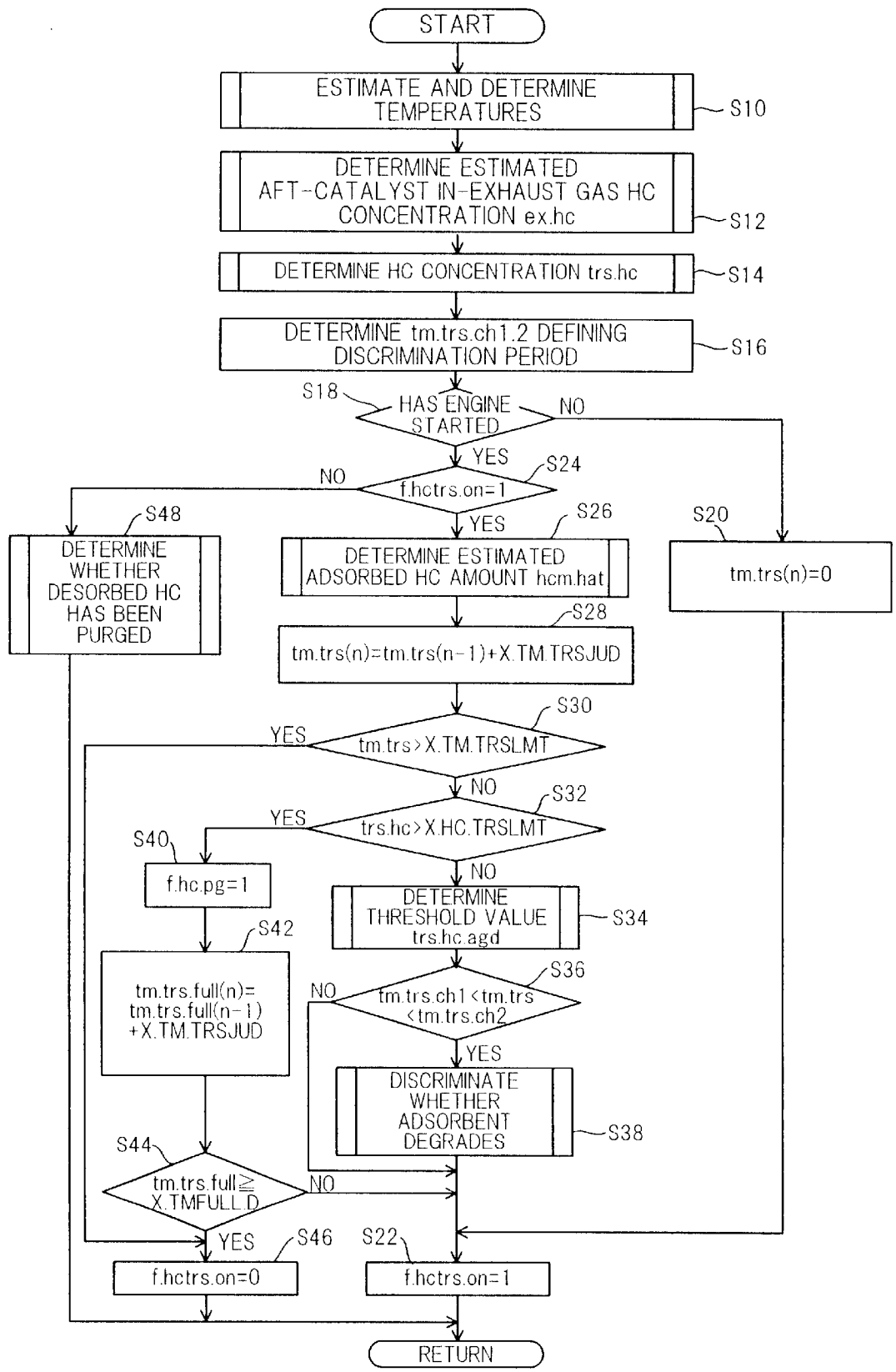

tmphat.trs tmphat.trs

DEGRADATION DISCRIMINATION SYSTEM OF INTERNAL COMBUSTION ENGINE EXHAUST GAS PURIFICATION SYSTEM

BACKGROUND OF THE INVENTION

1. Field of the Invention

This invention relates to a degradation discrimination system of an internal combustion engine exhaust gas purification system, more particularly to a system for discriminating whether an exhaust gas purification system comprising an adsorbent for adsorbing unburned components including the hydrocarbons (HC) in the exhaust gas generated by an internal combustion engine, has degraded or deteriorated.

2. Description of the Related Art

Internal combustion engines are ordinarily provided with a catalyst (a three-way catalytic converter) in the exhaust system which removes HC, NOx and CO components in the exhaust gas generated by the engine. However, when the catalyst is not activated, for example, at the time of engine cold-starting, unburned components of the exhaust gas including unburned HC are released immediately into the atmosphere.

For that reason, there has been proposed an exhaust gas purification system which has an adsorbent made of a zeolite material or some similar material installed in a bypass exhaust gas passage branched from the exhaust pipe at a location downstream of the catalyst, which merges into the exhaust pipe at a downstream point and has a switch-over valve which opens or closes the bypass exhaust gas passage. The switch-over valve opens the bypass exhaust gas passage when the engine is started to introduce the exhaust gas such that the adsorbent adsorbs unburned components including the HC when the catalyst is not activated and closes the bypass exhaust gas passage such that the adsorbent desorbs the adsorbed component and the desorbed components are thereafter recirculated at a position upstream of the catalyst after the catalyst has been activated.

Since a desired exhaust gas purification can not be achieved if any degradation or abnormality arises in such an engine exhaust gas purification system, Japanese Laid-Open Patent Application No. Hei 8 (1996)-93,458, for example, proposes the technique to discriminate whether any degradation or abnormality arises in the system. Another Japanese Laid-Open Patent Application, No. Hei 8 (1996)-218, 850 proposes a similar technique.

Specifically, Japanese Laid-Open Patent Application No. Hei 8 (1996)-93,458 proposes providing an HC sensor at a position downstream of the bypass exhaust gas passage for detecting the HC concentration of the exhaust gas at that location. In this prior art, the HC sensor detects the HC concentration in the adsorption mode and in the desorption mode respectively. The detected values are compared with predetermined values and based on the result of the comparison, it is discriminated whether any trouble has occurred in a mechanical part such as a switch-over valve.

In addition, this prior art proposes providing the HC sensor at a recirculation passage to determine the total amount of HC being recirculated, and by comparing the determined amount with a predetermined value, it discriminates whether a trouble has occurred in a mechanical part such as a valve for opening/closing the recirculation passage.

Japanese Laid-Open Patent Application No. Hei 8 (1996)-218,850 proposes providing $O_2$ sensors at a position upstream of the adsorbent, but downstream of the catalyst and at a position upstream of the recirculation passage. In this prior art, a time lapse until the rich/lean signals of both the sensors become equal to each other is measured and based on the measured time, it discriminates whether any abnormality arises in the system such as at the adsorbent.

Specifically, based on the assumption that the air/fuel ratio in the recirculation passage becomes richer than that at a position downstream of the adsorbent since the desorbed HC is recirculated together with the exhaust gas, but becomes equal to the air/fuel downstream of the adsorbent after the desorbed HC has been purified, the second prior art conducts the discrimination by measuring the time lapse until the outputs of the air/fuel ratio sensors coincide. Similarly, the second prior art proposes providing an HC sensor, instead of the oxygen sensor, to discriminate the occupance of abnormality based on the HC concentration in the desorption mode.

Although the first prior art mentioned in Japanese Laid-Open Patent Application No. Hei 8 (1996)-93, 458 monitors the behavior of HC directly through the HC sensor, the first prior art can not discriminate whether the abnormality has occurred in the adsorbent or any other part such as switch-over valve. In other words, the first prior art can not discriminate the abnormality or degradation arising in the adsorbent accurately.

The second prior art mentioned in Japanese Laid-Open Patent Application No. Hei 8 (1996)-218,850 can similarly discriminate the abnormality or degradation arising in the system including the adsorbent by detecting the HC concentration in the desorbtion mode. However, since the second prior art does not detect the concentration or amount of HC flowing into and adhering to the adsorbent in the adsorption mode, the second prior art is not always satisfactory in the discrimination accuracy if there are variances in the amount of HC. The same argument will also be applied in a case when the amount of recirculation fluctuates.

SUMMARY OF THE INVENTION

An object of the invention is therefore to provide a degradation discrimination system of an internal combustion engine exhaust gas purification system having an adsorbent installed at a bypass exhaust gas passage branched from the exhaust pipe that is opened by a switch-over valve at engine starting to introduce the exhaust gas such that the adsorbent adsorbs unburned HC components in the exhaust gas generated by the engine and is closed such that the adsorbent desorbs the HC component and the desorbed HC component is thereafter recirculated at a location upstream of a catalyst, which enables to discriminate the degradation or deterioration of the adsorbent accurately by directly monitoring the behavior of the HC component including the adsorption mode during which the adsorbent adsorbs the HC component through an HC concentration detecting means.

In order to achieve the object, there is provided a system for discriminating degradation of an exhaust purification system of an internal combustion engine having an adsorbent installed at a bypass exhaust gas passage branched from an exhaust pipe of the engine and merged into the exhaust pipe at a location downstream of the adsorbent, the bypass exhaust gas passage being opened by a switch-over valve at starting of the engine to introduce the exhaust gas such that the adsorbent adsorbs unburned HC in exhaust gas generated by the engine and being closed such that the adsorbent desorbs the adsorbed HC and the desorbed HC is thereafter recirculated at a position upstream of a catalyst, comprising: an HC sensor installed in the bypass exhaust gas passage at least one of a first position at the adsorbent and a second position downstream of the adsorbent for detecting concentration of HC introduced in the bypass exhaust gas passage in an adsorption mode where the adsorbent adsorbs HC; and adsorbent degradation discriminating means for comparing the detected concentration of HC with a threshold value and for discriminating whether the adsorbent has degraded based on a result of comparison.

BRIEF EXPLANATION OF THE DRAWINGS

The objects and advantages of the invention will become more apparent from the following descriptions and drawings, in which:

FIG. 5 is a chart showing the property of zeolites (to be used as a material for an adsorbent illustrated in FIG. 1) relative to HC compounds in the exhaust gas generated by the engine;

FIG. 9 is a view, similar to FIG. 8, but showing a case in which the adsorbent is discriminated not to be degraded;

FIG. 10 is a view, similar to FIG. 8, but showing a case in which the adsorbent is discriminated to be degraded;

FIG. 11 is a flow chart similarly showing the operation of the system illustrated in FIG. 1;

PREFERRED EMBODIMENTS OF THE INVENTION

Embodiments of the invention will now be explained with reference to the drawings.

Figure 1:
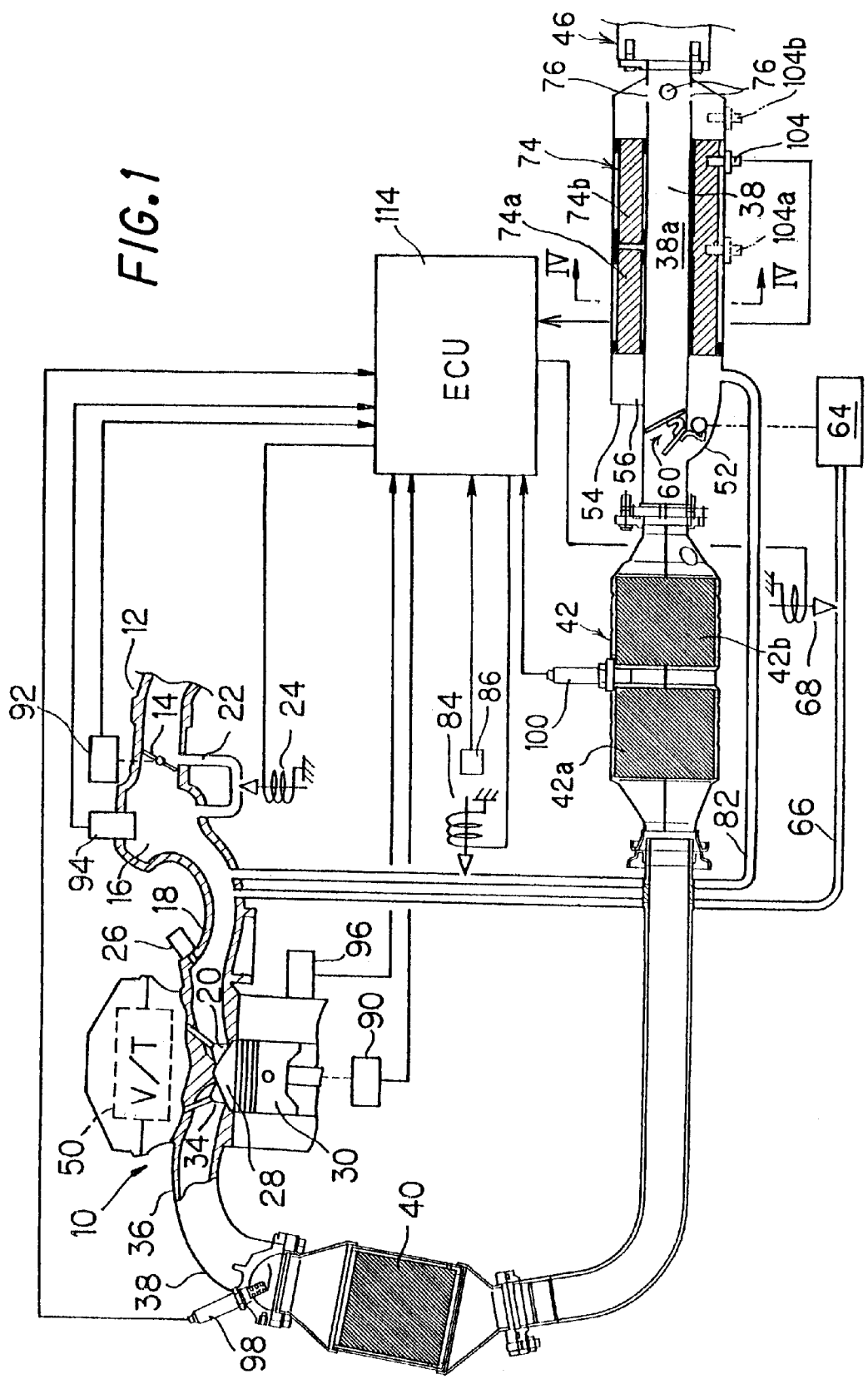
FIG. 1 is a schematic view showing the overall configuration of a degradation discrimination system of an internal combustion engine exhaust gas purification system according to a first embodiment of the invention.

FIG. 1 is a view schematically showing the overall configuration of a degradation discrimination system of an internal combustion engine exhaust gas purification system according to an embodiment of the invention.

Reference numeral 10 in this figure designates an overhead cam (OHC) in-line four-cylinder internal combustion engine. Air drawn into an air intake pipe or passage 12 through an air cleaner (not shown) mounted separately is supplied to the first to fourth cylinders (only one is shown) through a surge tank 16, an intake manifold 18 and two intake valves 20 (only one is shown), while the flow thereof is adjusted by a throttle valve 14 and is supplied to the first to four cylinders of the engine 10. The throttle valve 14 is bypassed by a bypass 22 provided at the air intake pipe 12. A valve (EACV) 24 comprised of an electromagnetic solenoid valve is installed in the bypass 22 for closing the same.

A fuel injector 26 is installed in the vicinity of the intake valves 20 of each cylinder for injecting fuel for the cylinder concerned. The injected fuel mixes with the intake air to form an air-fuel mixture that is supplied into a combustion chamber 28 and is compressed in the compression stroke and is ignited by a spark plug (not shown). The resulting combustion of the air-fuel mixture drives a piston 30 downwards.

The exhaust gas produced by the combustion is discharged through two exhaust valves 34 (only one is shown) into an exhaust manifold 36, from where it passes through an exhaust pipe or passage 38 to a first catalyst (catalytic converter) 40 installed immediately below the exhaust manifold 36 and a second catalyst 42 comprising a first catalyst bed 42a and a second catalyst bed 42b (all three-way catalytic converters) where noxious components are removed therefrom before it is discharged into the atmosphere via a vehicle rear assembly 46 including a muffler and a tail pipe (neither shown).

The engine 10 is equipped with a variable valve timing mechanism 50 (illustrated as "V/T" in FIG. 1). The variable valve timing mechanism 50 switches the opening/closing timing of the intake and/or exhaust valves between two types of timing characteristics in response to the engine speed NE and the engine load (e.g. the manifold absolute pressure PBA), i.e. a characteristic for low engine speed and a characteristic for high engine speed. The characteristics include one of the two intake valves being operated at a rest position.

The exhaust pipe 38 is connected to a chamber 54, cylindrical in shape, at a location downstream of the second catalyst 42. More specifically, the exhaust pipe 38 is branched off downstream of the second catalyst 42 to form a branch 52. The branch 52 is connected to the chamber 54 which is air-tightly connected to the exhaust pipe 38 to surround the same. With this passages for exhaust gas flow are formed; a main exhaust gas passage 38a passing through the inside of the exhaust pipe 38 and a bypass exhaust gas passage 56 passing through the branch 52 and the inner space of the chamber 54.

Figure 2:
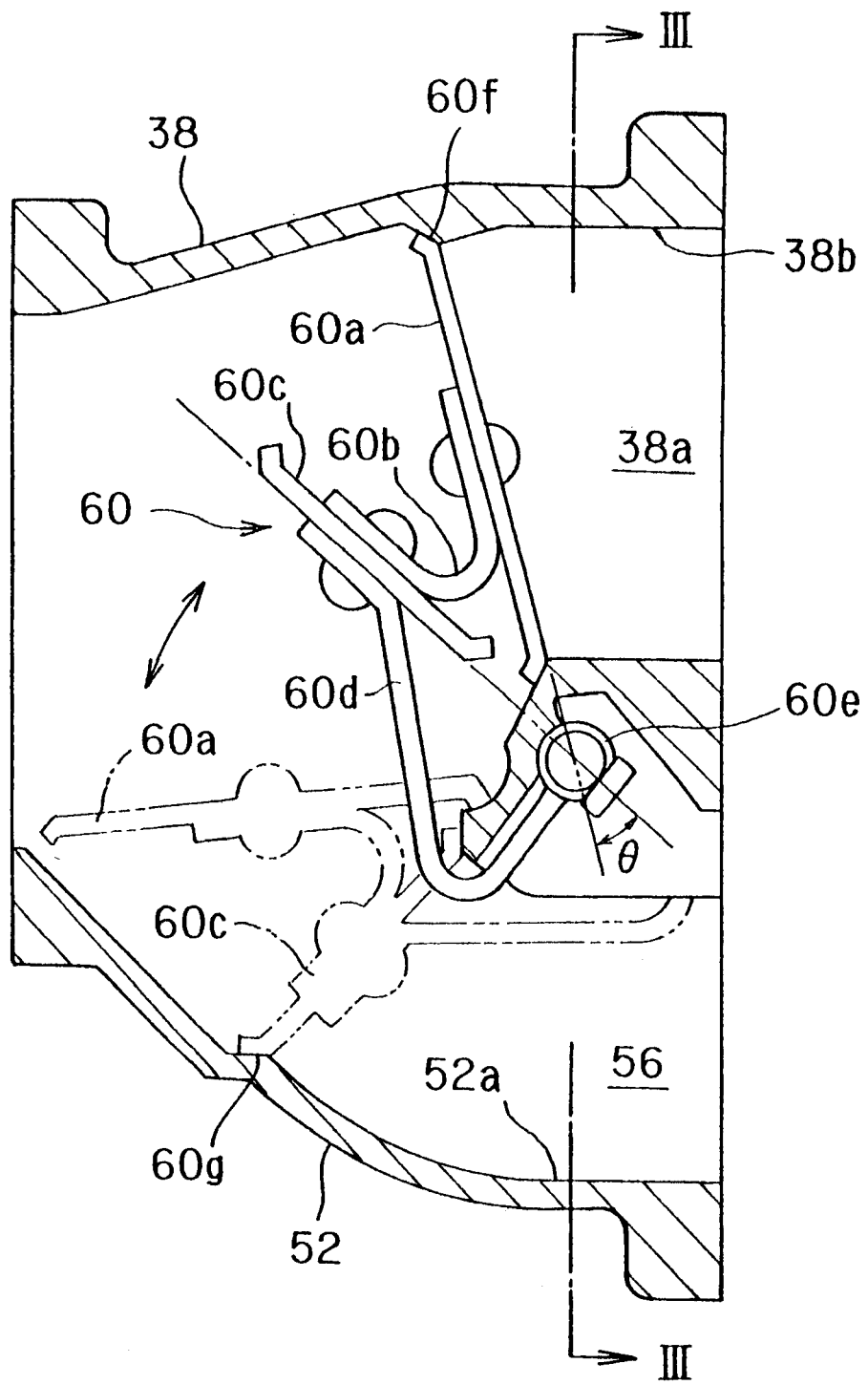
FIG. 2 is an enlarged sectional view of a switch-over valve illustrated in FIG. 1.

A switch-over valve 60 is provided in the vicinity of the branching point at the entrance of the chamber 54. FIG. 2 is an enlarged sectional view of the switch-over valve 60 and FIG. 3 is a sectional view taken along III—III of FIG. 2.

Figure 3:
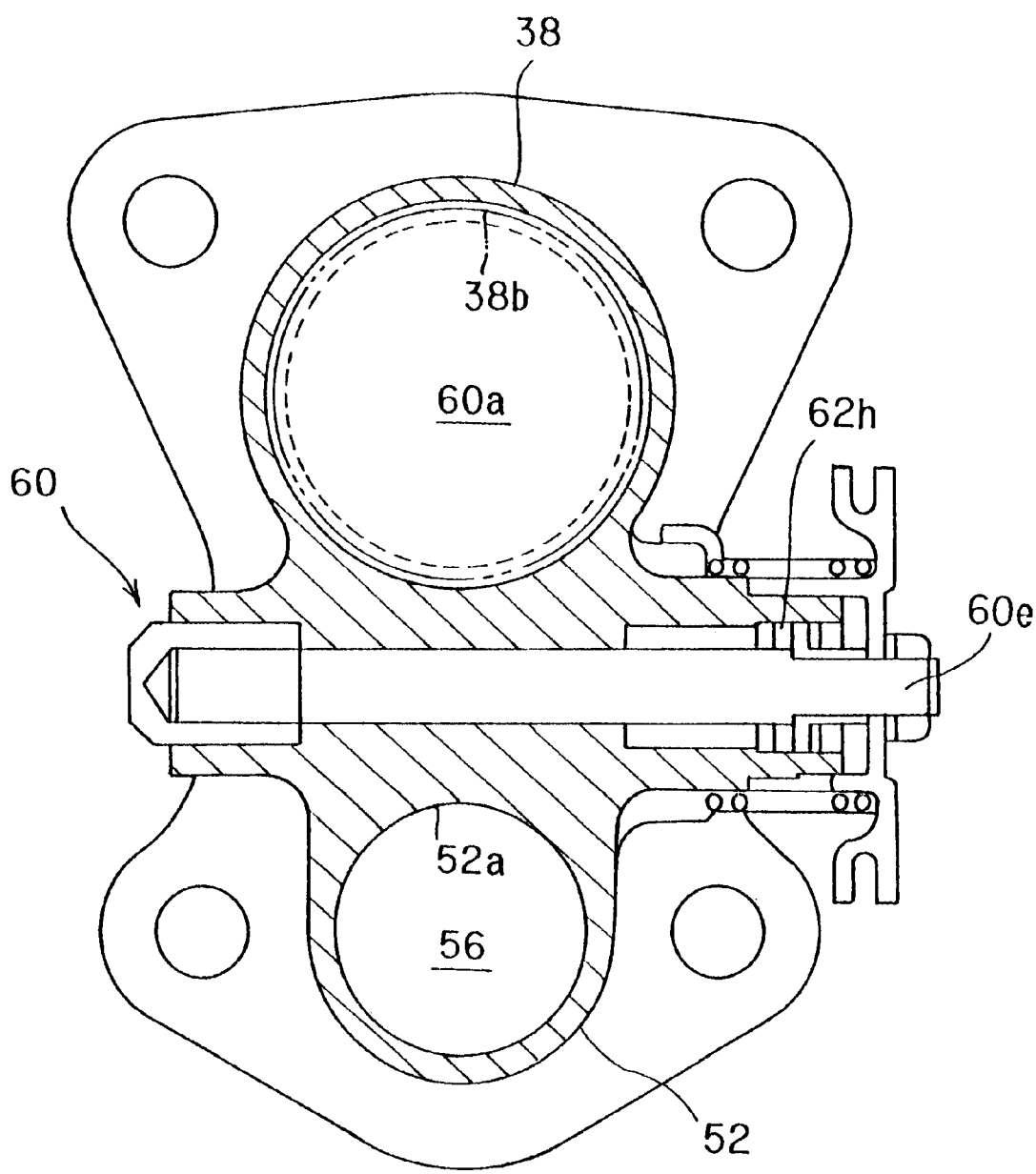
FIG. 3 is a sectional view taken along III—III of FIG. 2.

Explaining the switch-over valve 60 with reference to FIGS. 2 and 3, it comprises a first valve disc 60a which is greater in diameter than the exhaust pipe inner wall 38b defining the main exhaust gas passage 38a, and an arm 60b in an inverted-C shape which connects the first valve disc 60b with a second valve disc 60c which is greater than the diameter of the wall 52a of the branch 52 defining the bypass exhaust gas passage 56. A stem 60d is used to connect the second valve disc 60c to a shaft 60e.

As shown in FIG. 1, the shaft 60e is connected to a valve actuator 64. The valve actuator 64 has a conduit 66 which is connected to the air intake pipe 12 at a location downstream of the throttle valve 14. An electromagnetic solenoid valve (referred later as "TRPV") 68 is installed in the conduit 66, which opens the conduit 66 when energized to introduce the negative pressure therein.

Explaining the valve operation more specifically with reference to FIG. 2, the valve actuator 64 operates to rotate shaft 60e in the position shown by solid lines in the figure when the negative pressure is introduced such that the first valve disc 60a rests on a valve seat 60f to close the main exhaust gas passage 38a (in other words, it opens the bypass exhaust gas passage 56). On the other hand, when the TRPV 68 is deenergized, the conduit 66 is open to the air. As a result, the shaft 60e is returned to a position shown by phantom lines in the figure by a return spring (not shown) such that the second valve disc 60c rests on a valve seat 60g to close the bypass exhaust gas passage 56 (in other words, it opens the main exhaust gas passage 38a).

The second valve disc 60c (and the first valve disc 60a) can be at any position between those illustrated in FIG. 2 by solid lines and phantom lines, by regulating the amount of negative pressure introduced in the conduit by operating the TRPV 68 in such a way that the bypass exhaust gas passage 56 (and the main exhaust gas passage 38a) is opened by a slight amount.

As shown in FIG. 2, the first and second valve discs 60a, 60c are fixed to the shaft 60e at a predetermined angle θ in such a way, that when the first valve disc 60a closes the main exhaust gas passage 38a, the second valve disc 60c is lifted from the valve seat 60g so as not to block the exhaust gas flowing into the bypass exhaust gas passage 56, while, when the second valve disc 60c closes the bypass exhaust gas passage 56, the first valve 60a is lifted from the valve seat 60f so as not to block the exhaust gas flowing into the main exhaust gas passage 38a.

Returning to the explanation of FIG. 1, an adsorbent (HC adsorbing means or HC adsorbing catalyst) 74 is installed at the bypass exhaust gas passage 56 in the chamber 54. The adsorbent 74 comprises a first adsorbent bed 74a (provided upstream, i.e. at a position closer to the branch 52) and a second adsorbent bed 74b (provided downstream, i.e. at a position closer to the vehicle rear assembly 46).

Figure 4:
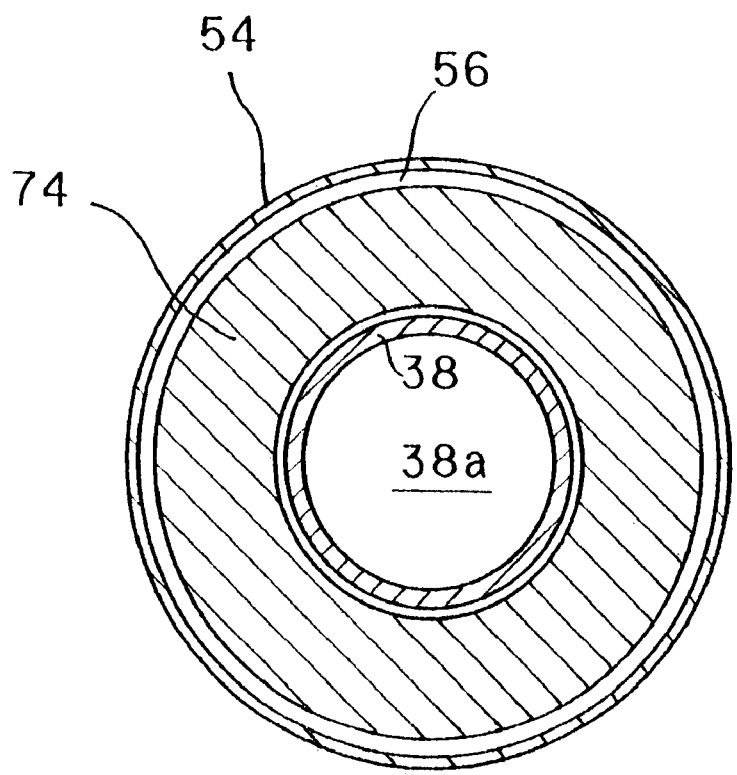
FIG. 4 is a sectional view taken along IV—IV of FIG. 1.

Specifically, as shown in FIG. 4, the chamber 54 is configured to be cylindrical in cross section such that it completely encircles the exhaust pipe 38. More specifically, the adsorbent 74 is positioned close to the exhaust pipe 38 in such a way that the temperature increase of the adsorbent 74 is promoted such that the adsorbed unburned component is desorbed as quickly as possible and is recirculated into the engine intake.

The adsorbent 74 preferably comprises a porous material having a large surface area such as zeolite (the general name of crystalline aluminosilicate or metallosilicate). The adsorbent made from zeolite has small pores or holes in it which are regular in shape and size. The pore sizes are different for different zeolites.

A pore size of 0.2 nm approximately corresponds to the molecular size of HC. The adsorbent made from zeolite adsorbs HC at a low temperature, less than 100° C. and desorbs the adsorbed HC at a higher temperature, ranging from 100 ° C. to 250° C. These temperatures are different for different kinds of HC (number of carbons) and increase with increasing number of carbons. Moreover, these temperatures also vary depending on the kind of zeolites.

The adsorption is classified into two types, i.e. a mechanical adsorption caused by intermolecular attractions and a chemical adsorption caused by chemical bonds The adsorption in the zeolite adsorbent is mainly the mechanical one. In the mechanical adsorption, the kind (number of carbons) of HC to be adsorbed is determined by the pore size of zeolite constituting the adsorbent.

FIG. 5 is a chart showing the property of zeolites relative to HC compounds in five kinds (number of carbons). In the figure, the symbols indicate the ability of adsorption, i.e. ○: excellent; Δ: medium; : poor.

Thus, of the various zeolites, an appropriate zeolite or a combination of zeolites such as a combination of Ga-MFI and mordenite should preferably be selected as the adsorbent. Although not shown, some HC compounds such as methane ($CH_4$) will require other kind of zeolites having finer pores.

The adsorbent 74 should be prefabricated from a mixture of selected zeolite(s) and a catalyzer element in a honeycomb structure held in a specially designed metal casing. The adsorbent 74 made from any kind of zeolite exhibits an excellent heat proof (thermal stability) property and does not degrade or deteriorate under a high temperature if the temperature is less than 1100° C. or thereabout. The marginal temperature (beneath of which zeolite does not degrade) differs for different zeolites. If different zeolites are combined to be used, the combination will determine the marginal temperature.

Returning to the explanation of FIG. 1, the exhaust pipe 38 is provided near the end of the chamber 54 (close to the vehicle rear assembly 46) with four holes (confluence points) 76 which are circumferentially located at intervals of 90 degrees. The bypass exhaust gas passage 56 is thus formed from the branch 52 and extends into chamber 54 via the adsorbent 74 up to the holes 76 where it merges into the main exhaust gas passage 38a in the exhaust pipe 38.

The chamber 54 is connected, at or near the entrance, i.e., at a position upstream of the adsorbent 74 and close to the branch 52, to an EGR conduit (passage) 82. The EGR conduit 82 is connected, at the other end, to the air intake pipe 12 at a position downstream of the throttle valve 14. The EGR conduit 82 is provided with an EGR control valve (electromagnetic solenoid valve) 84 which closes the conduit 82 when made ON (energized). A lift sensor 86 is provided in the vicinity of the EGR control valve 84 and generates a signal indicative of the amount of lift (stroke) named "lact" of the valve 84. The lift amount indicates the opening degree of the valve 84.

The exhaust gas purification system comprises the adsorbent 74, the bypass exhaust gas passage 56, the switch-over valve 60, the valve actuator 64, the holes 76, the EGR conduit 82, the EGR control valve 84, etc.

The ignition distributor (not shown) of the engine 10 is provided with a crank angle sensor 90 which generates a signal indicative of Top Dead Center (TDC) of the piston 30 and a signal indicative of unit angles divided into smaller values. The engine 10 is further provided with a throttle position sensor 92 which generates a signal indicative of the degree of opening θTH of the throttle valve 14, a manifold absolute pressure (MAP) sensor 94 which generates a signal indicative of the aforesaid manifold absolute pressure PBA of the intake manifold downstream of the throttle valve 14 in terms of absolute value and indicative of the engine load, and a coolant temperature sensor 96 installed in the vicinity of a coolant passage (not shown) of the engine which generates a signal indicative of the temperature TW of the engine coolant.

Further, an universal air/fuel ratio sensor 98 (named "LAF sensor") is provided in the exhaust pipe 38 at or downstream of a confluence point of the exhaust manifold 36 and upstream of the first catalyst 40, where it generates a signal indicative of the oxygen concentration in the exhaust gas, as explained later. In addition, an $O_2$ sensor 100 is installed in the exhaust pipe 38 at a location between the first catalyst bed 42a and the second catalyst bed 42b, which generates an ON/OFF signal each time the oxygen concentration in the exhaust gas changes from rich to lean and vice versa.

Furthermore, an HC sensor 104 is installed at the bypass exhaust gas passage 56 in the chamber 54, more precisely at the second bed adsorbent bed 74b at a location close to its rear end (close to the vehicle rear assembly 46) and generates a signal indicative of the concentration of HC (hereinafter referred to as "trs.hc") in the exhaust gas flowing in the bypass exhaust gas passage 56 and flowing into the adsorbent 74 at that location. The sensor may be located, as shown in the figure by the phantom lines with the reference 104a, at a position between the first adsorbent bed 74a and the second adsorbent bed 74b, or may be located, as shown in the figure by the phantom lines with the reference 104b, at a position downstream of the second adsorbent bed 74b (closer to the vehicle rear assembly 46)

The HC sensor 104 is, for example, a threshold current type sensor made from a solid-electrolyte comprising some kinds of barium oxides, as disclosed in Japanese Laid-Open Patent Application No. Hei 10 (1998)-300, 718.

Furthermore, a valve timing sensor (not shown) is provided in a hydraulic pressure circuit (not shown) of the variable valve timing mechanism 50 and generates a signal indicating which characteristic is selected.

These output signals generated by the sensors are forwarded to an Electronic Control Unit (ECU) 114 comprising a microcomputer.

Figure 6:
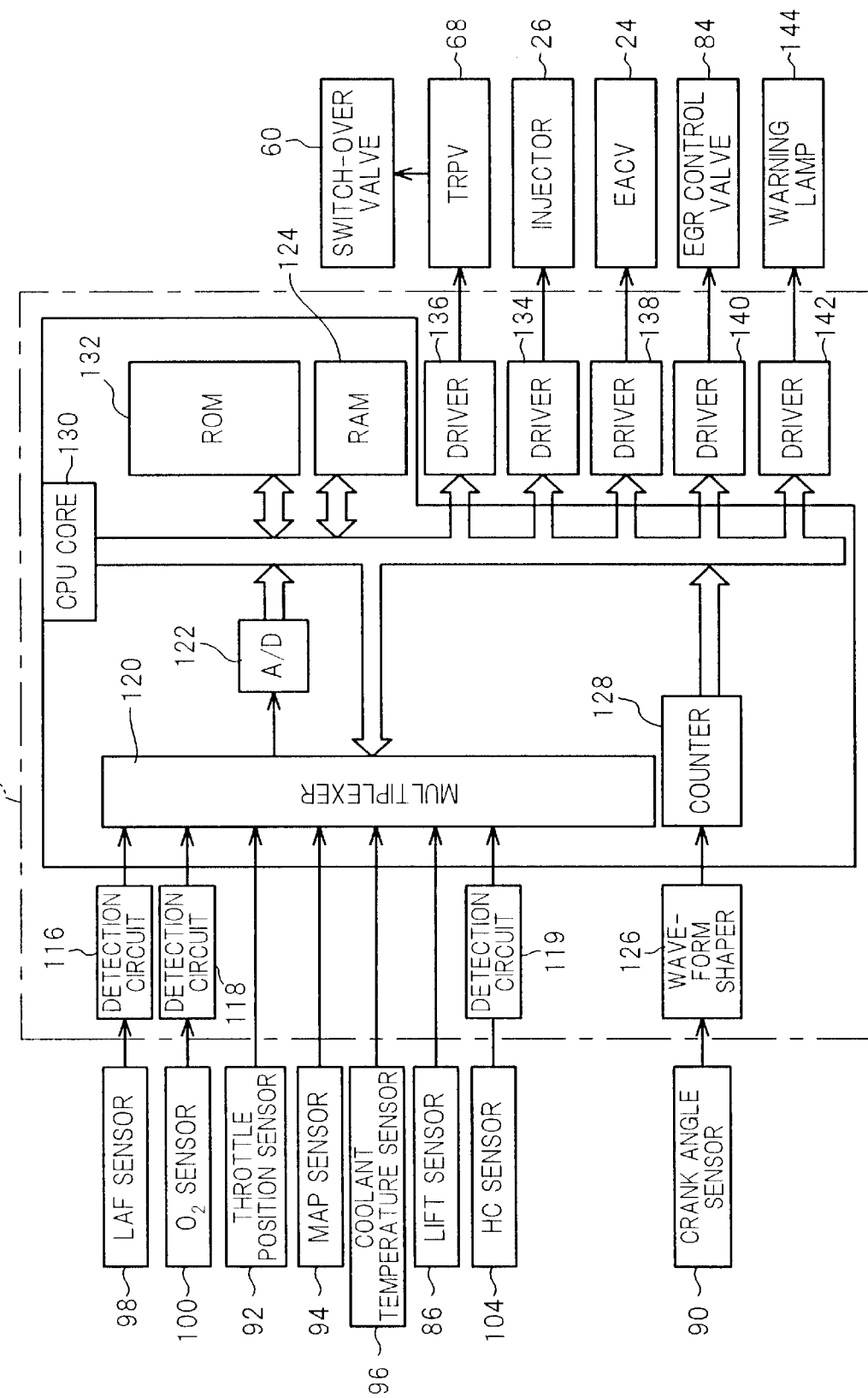
FIG. 6 is a block diagram showing the details of an Electronic Control Unit (ECU) illustrated in FIG. 1.

Details of the ECU 114 are shown in the block diagram of FIG. 6.

The output of the LAF sensor 98 is received by a first detection circuit 116, where it is subjected to appropriate linearization processing for producing an output characterized in that it varies linearly with the oxygen concentration of the exhaust gas over a broad range extending from lean to rich. The output of the $O_2$ sensor 100 is input to a second detection circuit 118 which generates a switching signal indicating that the air/fuel ratio in the exhaust gas emitted from the engine 10 is rich or lean with respect to the stoichiometric air/fuel ratio. The output of the HC sensor 104 is input to a third detection circuit 119 which generates a signal indicative of the concentration of HC in the exhaust gas.

The output of these detection circuits 116, 118, 119 are forwarded through a multiplexer 120 and an A/D converter 122 to a RAM (random access memory) 124 in a CPU (central processing unit). Specifically, the CPU has a CPU core 130, a ROM (read-only memory) 132 and the RAM 124, and the output of the detection circuits 116, 118, 119 are A/D-converted and stored in buffers of the RAM 124. The outputs of the analog sensors including the throttle position sensor 92 are similarly input to the CPU via the A/D converter 122 to the RAM 124.

The output of the crank angle sensor 90 is shaped by a wave-form shaper 126 and has its output value counted by a counter 128. The count is inputted into the CPU and the engine speed NE is detected or calculated from the count. In accordance with commands stored in the ROM 132, the CPU core 130 computes a manipulated variable including a basic fuel injection amount TI and an output fuel injection amount TOUT obtained by correcting TI and drives the fuel injectors 26 of the respective cylinders via a driver 134.

The CPU core 130 also drives, via a driver 136, through the electromagnetic valve (TRPV) 68 and the valve actuator 64 (not shown in FIG. 6) to operate the switch-over valve 60, and the CPU core 130 further discriminates whether the adsorbent 74 has degraded or deteriorated. Here, the fact that "the adsorbent 74 has degraded or deteriorated" indicates the HC adsorption or ability of the adsorbent 74 has degraded or deteriorated Furthermore, the CPU core 130 drives the EACV 24 and the EGR control valve 84 through drivers 138, 140. Moreover, the CPU core 130 lights a warning lamp 144 (not shown in FIG. 1) through a driver 142.

Before entering into the operation of the degradation discrimination system of an internal combustion engine exhaust gas purification system according to the embodiment, the operation of the exhaust gas purification system using the adsorbent 74 will be described with reference to FIG. 7.

Figure 7A:
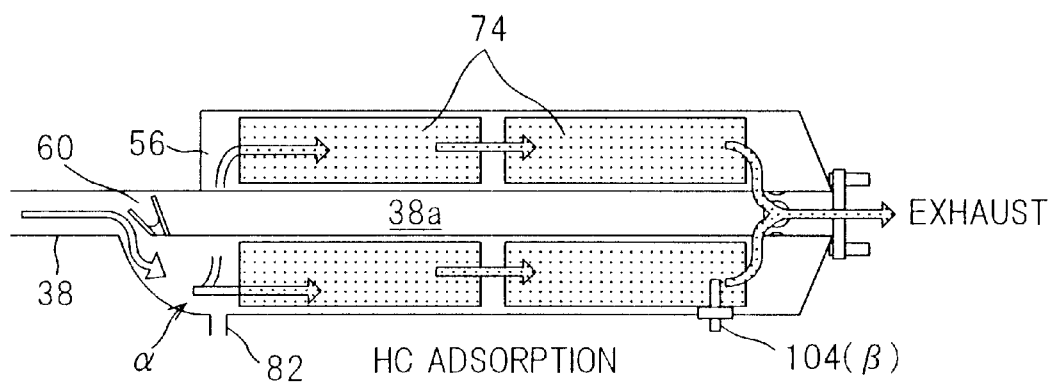
FIGS. 7A–7C are views showing the operation of the exhaust gas purification system including the adsorbent illustrated in FIG. 1.

In the exhaust gas purification system illustrated in the figure, when the engine 10 is cold-started, the switch-over valve 60 is kept in the position shown by the solid lines in FIG. 2 for a predetermined period of time (e.g., 40 sec.) since engine starting such that the main exhaust gas passage 38a is closed, while the bypass exhaust gas passage 56 is opened, as illustrated in FIG. 7A.

Since the first and second catalysts 40, 42 provided upstream of the adsorbent 74 have not been activated during the aforesaid period of time when the engine 10 was cold-started, the exhaust gas is not purified by the catalysts 40, 42. The exhaust gas flows through the bypass exhaust gas passage 56, as shown by arrows in FIG. 7A, and the unburned HC component is adsorbed by the adsorbent 74.

Figure 7B:
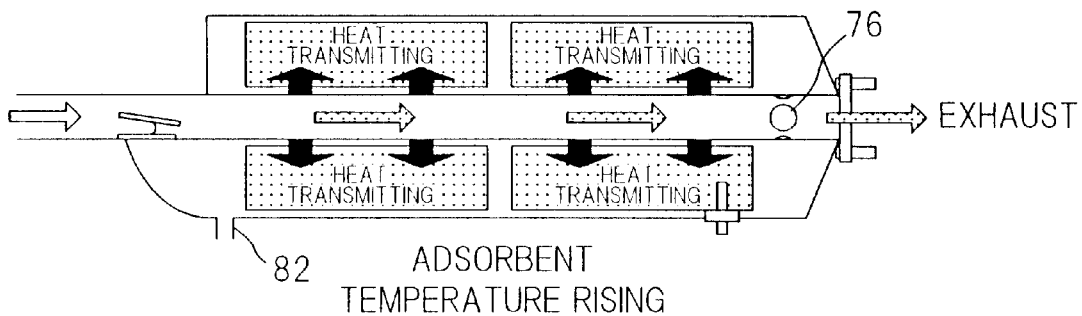

As the upstream catalysts 40, 42 are normally activated after a lapse of the predetermined period of time, the switch-over valve 60 is driven to the position shown by phantom lines in FIG. 2 such that the main exhaust gas passage 38a is opened, while the bypass exhaust gas passage 56 is closed, as illustrated in FIG. 7B.

Accordingly, the exhaust gas purified by the upstream catalysts 40, 42 flows through the main exhaust gas passage 38a and heats the adsorbent 74. As a result, the unburned HC component adsorbed by the adsorbent 74 begins to desorb. Since the pressure of the exhaust gas flowing through the main exhaust gas passage 38a is greater than that flowing through the bypass exhaust gas passage 56, a part or portion of the exhaust gas enters the bypass exhaust gas passage 56 through the holes 76.

Figure 7C:
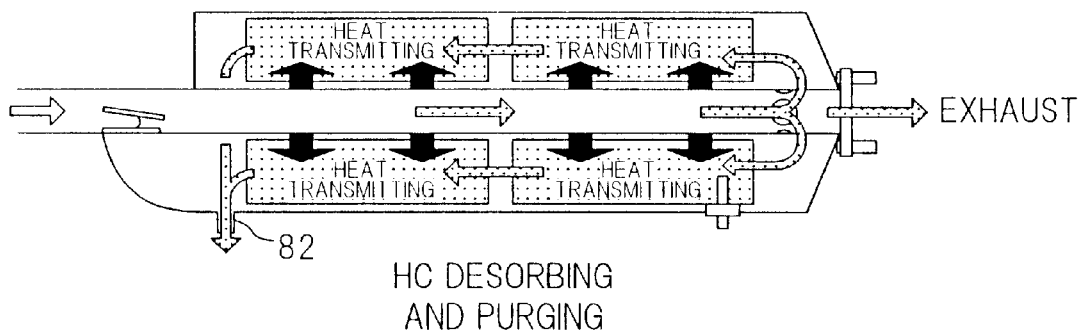

Then as illustrated in FIG. 7C, the desorbed unburned HC component is recirculated back to a position upstream of the first and second catalysts 40, 42, more specifically to the engine intake system through the EGR conduit 82, when the EGR is conducted. At this time, a part or portion of the exhaust gas flowing through the main exhaust gas passage 38a is sucked in by the negative pressure generated at the engine intake system and enters the bypass exhaust gas passage 56 through the holes 76.

The introduced exhaust gas flows through the bypass exhaust gas passage 56 in a direction opposite to that of the exhaust gas flowing through the main exhaust gas passage, while accelerating or expediting the heating of the adsorbent 74, and is recirculated into the engine intake system to be burned once again. The exhaust gas generated by this re-burning is purified by the upstream catalysts 40, 42 and flows out of the engine 10 through the main exhaust gas passage 38a.

Based on the above, the mode of operation of the degradation discrimination system of an internal combustion engine exhaust gas purification system according to the embodiment of the invention will be explained.

Figure 8:
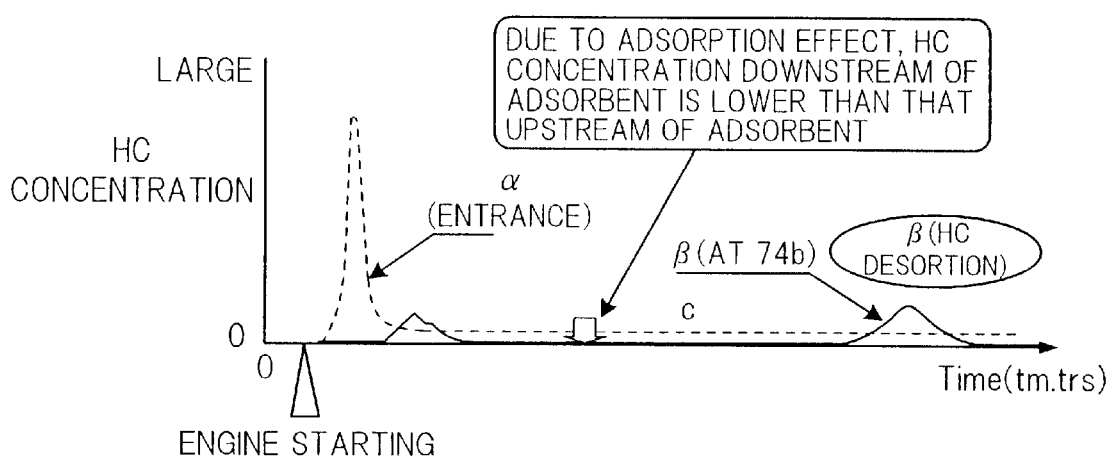
FIG. 8 is a time chart showing the operation of the degradation discrimination system of an internal combustion engine exhaust gas purification system according to the first embodiment illustrated in FIG. 1.

Outlining the operation with reference to FIGS. 7 and 8, in the operation of the system, more precisely in the discrimination of degradation of the adsorbent 74, when the HC concentration is measured at a point a and at a point β (the point where the HC sensor 104 is located) as shown in FIG. 7A, the measured result indicative of the behavior of the HC will be as shown in FIG. 8. From the measured result illustrated in FIG. 8, it can be found that, due to the adsorption effect of the adsorber 74, the HC concentration at the downstream point is lower than that of exhaust gas flowing into the adsorbent 74.

The invention was made based on this fact and the system according to this invention is configured to detect the HC concentration (hereinafter referred to as "trs.hc") at the rear end of the adsorbent 74 (or at a location downstream of the adsorbent) through the HC sensor 104, and to compare the detected HC concentration with a threshold value (for degradation discrimination, hereinafter referred to as "trs.hc.agd") such that the degradation can be discriminated based on the result of comparison as illustrated in FIGS. 9 and 10. The system is configured to determine the threshold value trs.hc.agd to be a value appropraitely indicative of the HC concentration to be compared with the detected value.

More specifically, in the case shown in FIG. 9, the threshold value trs.hc.agd is greater or equal to the detected HC concentration trs.hc. Since this indicates that the HC concentration trs.hc at the downstream point is less than or lower than the HC concentration in the exhaust gas flowing into the adsorbent (this concentration being hereinafter referred to as "ex.hc"), it can be discriminated that the adsorbent has not degraded or deteriorated. On the other hand, in the case shown in FIG. 10, since the detected HC concentration trs.hc is greater than the threshold value trs.hc.agd, it can be discriminated that the adsorbent has degraded or deteriorated.

The above will be explained in detail with reference to the flow chart of FIG. 11. The program in FIG. 11 is executed when the ignition switch (not shown) is made on and is looped once every 100 msec.

The program begins at S10 in which temperatures are estimated or detected.

Figure 12:
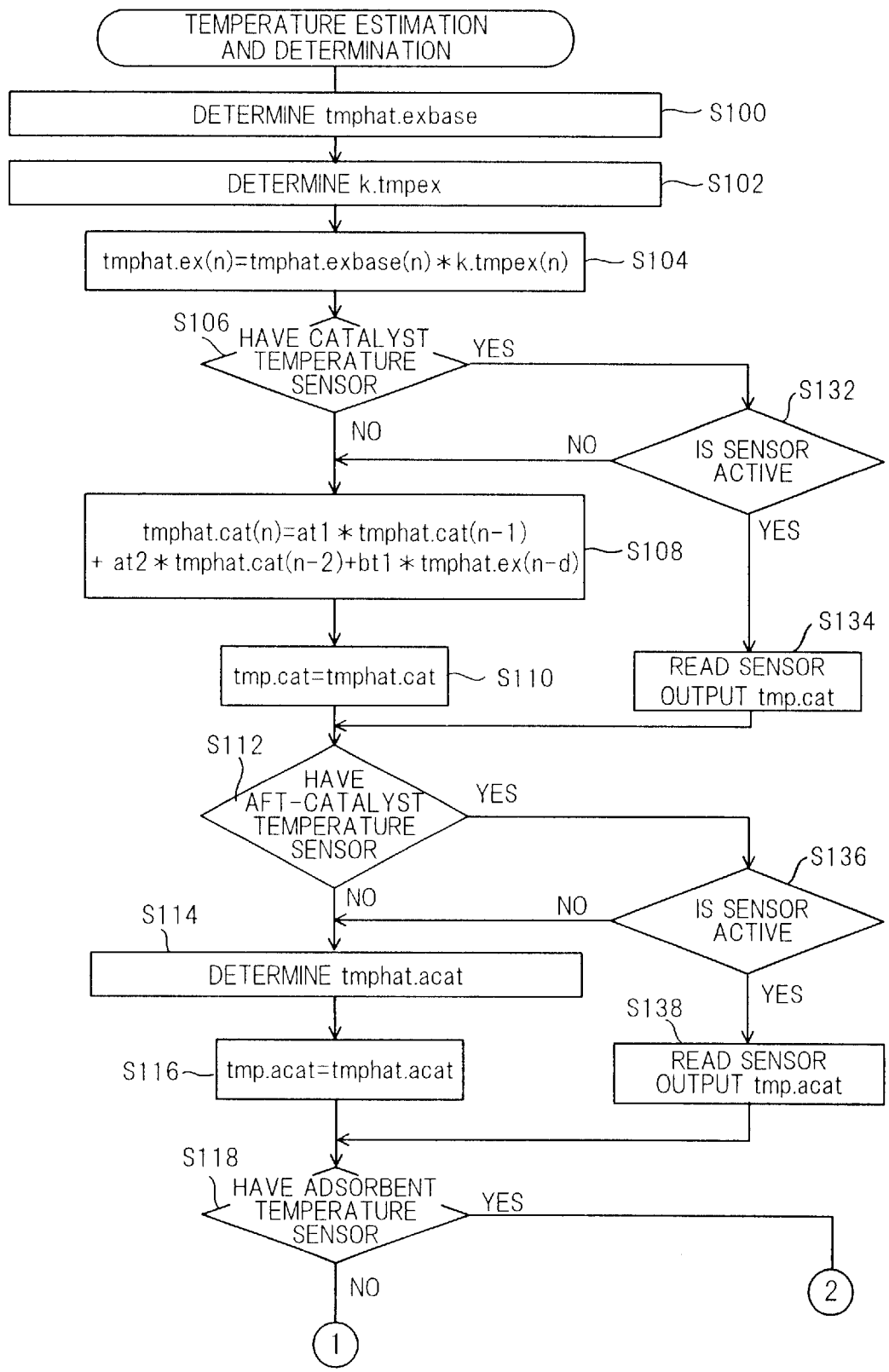
FIG. 12 is a first half of a flow chart showing the subroutine for estimating and determining temperatures referred to in the flow chart of FIG. 11.
Figure 13:
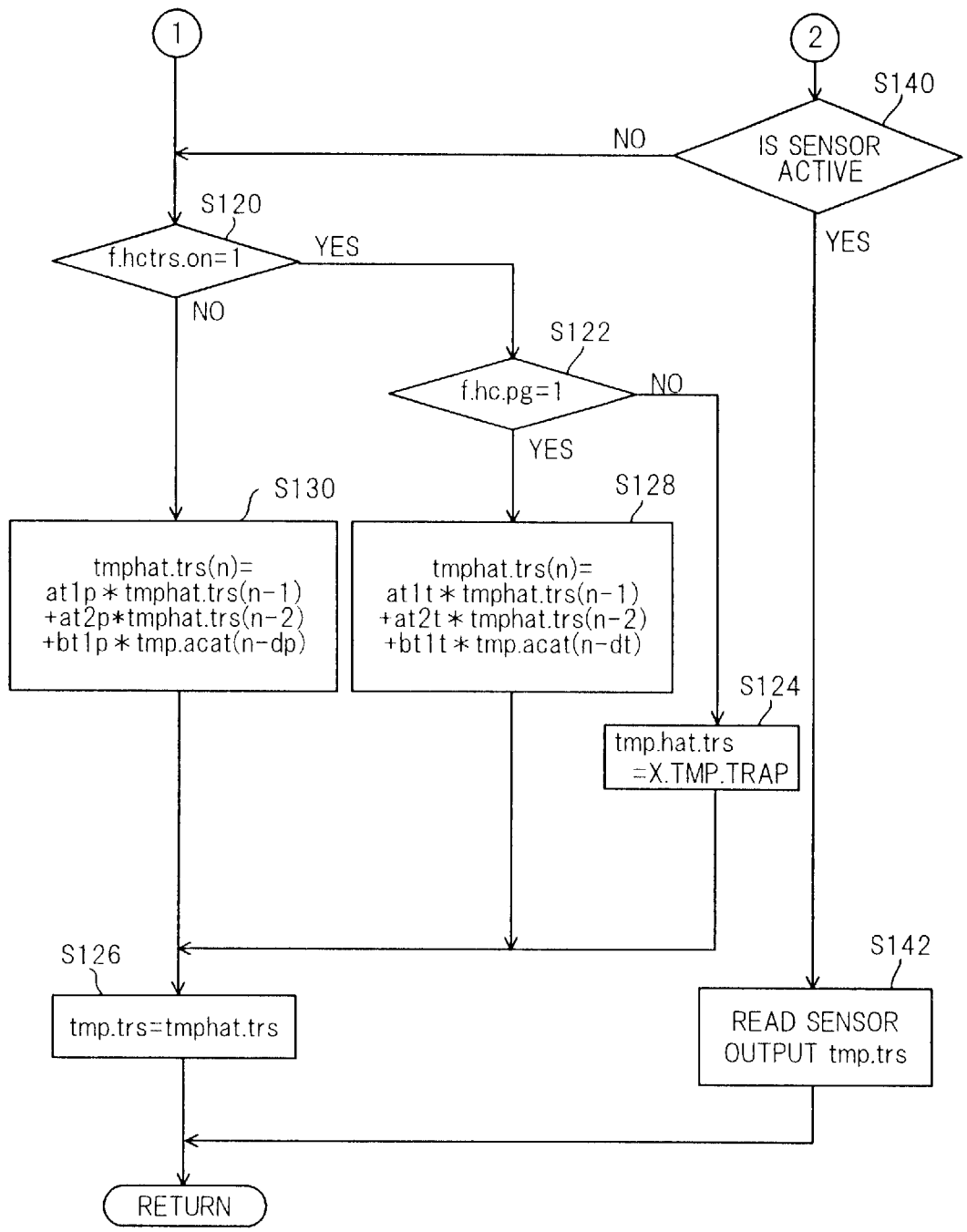
FIG. 13 is a second half of the flow chart showing the subroutine for estimating and determining temperatures referred to in the flow chart of FIG. 11.

FIGS. 12 and 13 are first and second halves of flow charts showing the subroutine for this.

The program begins in S100 in which a basic value of a fore-catalyst exhaust gas temperature (named "tmphat.exbase") is estimated or determined. The fore-aft exhaust gas temperature is an estimated temperature of the exhaust gas flowing into the first and second catalysts 40, 42 (i.e. the gas immediately exhausted from the combustion chamber 28) and the value tmphat.exbase is a base value thereof.

Figure 14:
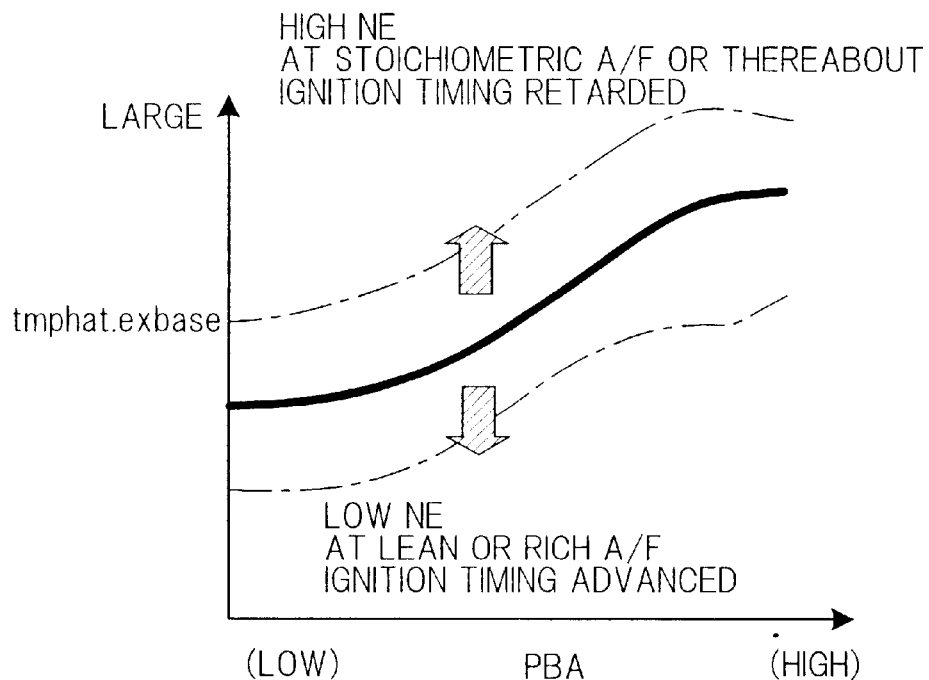
FIG. 14 is a graph showing characteristics of a basic value of an estimated aft-catalyst exhaust gas temperature referred to in the flow chart of FIG. 12.

Specifically, this is done by retrieving mapped data (whose characteristics are shown in FIG. 14) using the detected engine load (e.g. manifold absolute pressure PBA), the detected engine speed NE, the air/fuel ratio being operated, the ignition timing, etc. as address data.

More specifically, tmphat.exbase is retrieved using a characteristic shown by a solid line in the figure when the detected engine speed NE is within a range. On the other hand, tmphat.exbase is retrieved using upper characteristics shown by phantom lines when the detected engine speed NE is out of the range in the higher direction, or when the air/fuel ratio being operated is at the stoichiometric air/fuel ratio or thereabout, or when the ignition timing is retarded. Otherwise tmphat.exbase is retrieved using a lower characteristics shown by phantom lines.

It should be noted here that, if the engine 10 was a direct injection spark ignition engine in which gasoline is directly injected into the combustion chamber, the fuel injected in the intake stroke generates a pre-mixture combustion, while that in the compression stroke generates a stratified combustion. Thus, since the form of combustion is different with the fuel injection timing in the direct injection spark ignition engine, it would alternatively be possible to change the characteristics by the form of combustion when the engine 10 was a direct injection spark ignition engine.

The program then proceeds to S102 in which a post-engine-starting exhaust gas temperature correction coefficient (named "k.tmpex") is determined or calculated. This is done by retrieving mapped data (whose characteristics are shown in FIG. 15) using a value of a post-engine-starting timer (upcounter; the timer value is hereinafter referred to as "tm.trs") indicative of a period of time since engine starting and the detected engine coolant temperature TW as address data.

Specifically, k.tmpex is retrieved using a characteristic shown by a solid line in the figure when the detected engine coolant temperature TW is within a range. On the other hand, k.tmpex is retrieved using lower characteristics shown by phantom lines when the detected engine coolant temperature TW is out of the range in the lower direction, while k.tmpex is retrieved using upper characteristics shown by phantom lines when the detected engine coolant temperature TW is out of the range in the higher direction.

Figure 15:
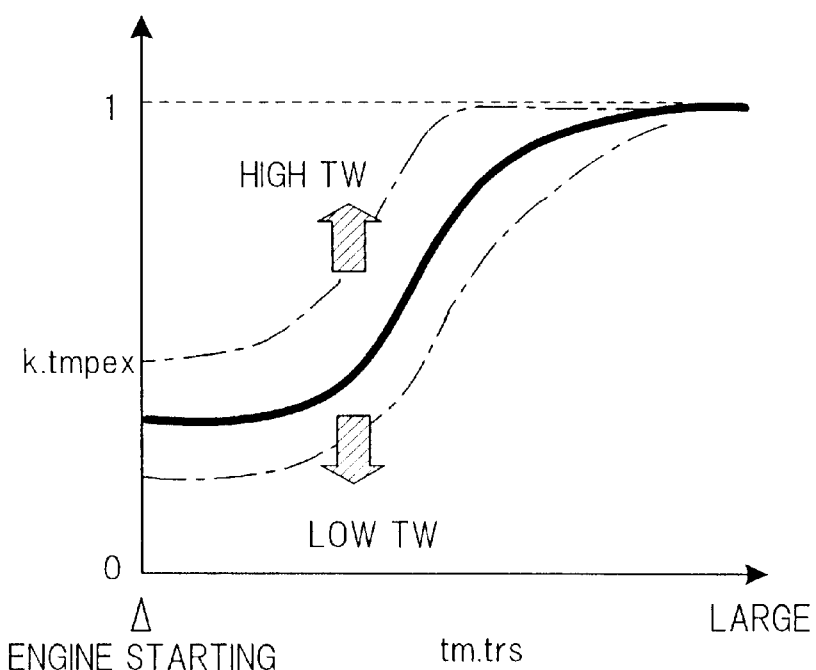
FIG. 15 is a graph showing characteristics of a post-engine-starting exhaust gas temperature correction coefficient referred to in the flow chart of FIG. 12.

In the characteristics shown in FIG. 15, the reason why k.tmpex is set to be smaller at a low TW than that at a high TW, is that, since the engine temperature is low at a low engine coolant temperature TW such that the heat generated by the exhaust gas is immediately emitted from the engine 10, the exhaust gas temperature drops accordingly.

The program then proceeds to S104 in which, as shown there, the fore-catalyst exhaust gas temperature tmphat.ex is determined (estimated) by multiplying the basic value tmphat.exbase by the correction coefficient k.tmpex.

The program then proceeds to S106 in which it is determined whether the system has a catalyst temperature sensor. A system according to a second embodiment has the sensor, however, the system according to this embodiment is not configured to have the sensor, the result in S106 is negative and the program proceeds to S108 in which the catalyst temperature is estimated or determined using a dynamic model described by an equation shown there. The estimated catalyst temperature is hereinafter referred to as "tmphat.cat".

In the equation, the suffix "n" represents a sampling number in the discrete-time system, specifically, the time at which the program of FIG. 11 flow chart is executed, more specifically, (n) indicates the current program-execution-time and (n-n) indicates the program-execution-time m-time earlier. For brevity, addition of (n) to values at the current time is often omitted.

Figure 16:
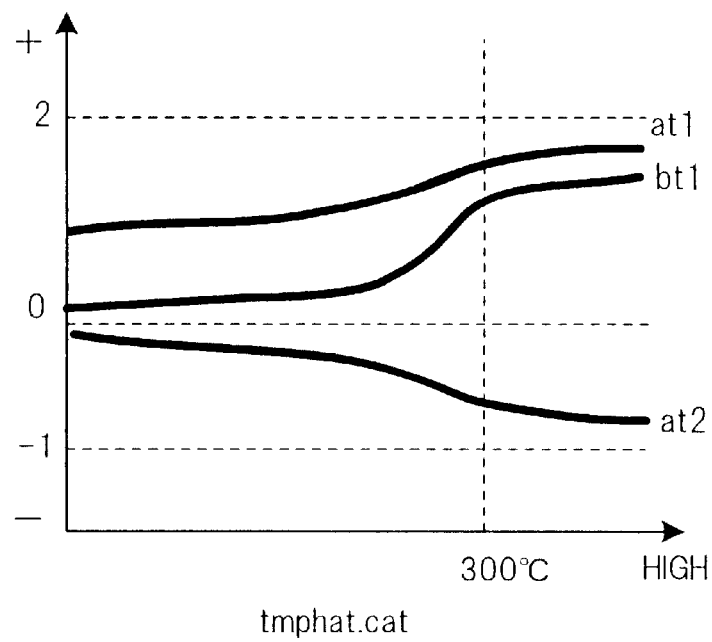
FIG. 16 is a graph showing characteristics of coefficients used in the determination of an estimated catalyst temperature referred to in the flow chart of FIG. 12.

Further, in the equation, "d" indicates a dead time. And, values "at1", "at2" and "bt1" indicate coefficients and are determined as values ranging from −1 to +2 by retrieving data from a table (whose characteristics are shown in FIG. 16) using the estimated catalyst temperature tmphat.cat, more precisely its last valve tmphat.cat(n−1) as address data.

The catalyst temperature tmphat.cat is thus estimated or calculated using a dynamic model constituted as a DARX model (auto-regressive model having a dead time in its input), in view of the dynamics of the catalysts 40, 42 including heat adsorption, the degree of activation and temperature change.

The program then proceeds to S110 in which the estimated catalyst temperature tmphat.cat is rewritten as the catalyst temperature tmp.cat. In other words, the estimated value is used as a substitution for the actual value.

The program then proceeds to S112 in which it is determined whether the system has an aft-catalyst temperature sensor. A system according to a third embodiment has the sensor, however, the system according to this embodiment is not configured to have the sensor, the result in S112 is negative and the program proceeds to S114 in which the aft-catalyst exhaust gas temperature (hereinafter referred as to "tmphat.acat") is estimated or determined. This is done by retrieving mapped data (whose characteristics are shown in FIG. 17) using the catalyst temperature tmp.cat and the estimated fore-catalyst exhaust gas temperature tmphat.ex as address data.

Figure 17:
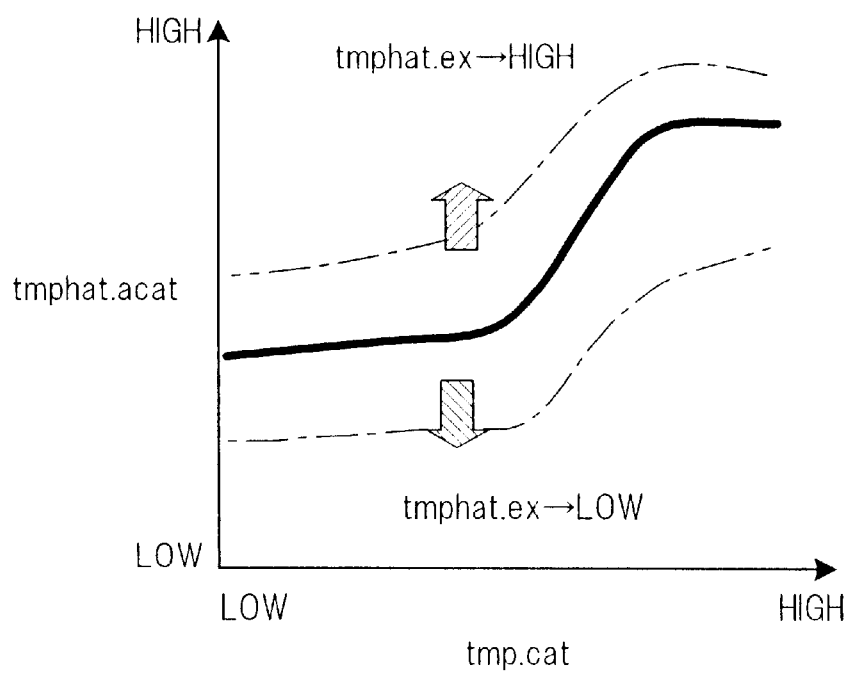
FIG. 17 is a graph showing characteristics of an estimated aft-catalyst exhaust gas temperature referred to in the flow chart of FIG. 12.

More specifically, tmphat.acat is retrieved using a characteristic shown by a solid line in FIG. 17 when the estimated fore-catalyst exhaust gas temperature tmphat.ex is within a range. On the other hand, when the estimated temperature tmphat.ex is out of the range, tmphat.acat is retrieved using an upper characteristic or a lower characteristic shown by phantom lines depending on the direction in which the estimated temperature tmphat.ex is out of the range. Similar to the determination of the value tmphat.exbase, it would alternatively be possible to change the characteristics shown in FIG. 17 by the form of combustion when the engine 10 was a direct injection spark ignition engine.

In the flow chart of FIG. 12, the program proceeds to S116 in which the estimated aft-catalyst exhaust gas temperature tmphat.acat is rewritten as the aft-catalyst exhaust gas temperature (named "tmp.acat"). In other words, the estimated value is used as a substitution for the actual value.

The program then proceeds to S118 in which it is determined whether the system is provided with an adsorbent temperature sensor. A system according to a fourth embodiment has the sensor, however, the system according to this embodiment is not configured to have the sensor, the result in S118 is negative and the program proceeds to S120 (in the flow chart of FIG. 13) in which it is determined whether the bit of a flag h.hctrs.on is set to 1. To set the bit of the flag to 1 indicates to issue the instruction to operate the switch-over valve 60 such that the bypass exhaust gas passage 56 is opened, while to reset it to 0 indicates to generate the instruction to operate the valve 60 such that the bypass exhaust gas passage 56 is closed.

Since the instruction is generated to operate the switch-over valve 60 to open the bypass exhaust gas passage 56 for a predetermined period of time (e.g. 40 sec.), since engine starting, the result in S120 is normally affirmative in the first program loop and the program proceeds to S122 in which it is determined whether the bit of a flag f.hc.pg (initially reset to 0) is set to 1. As mentioned above, the bypass exhaust gas passage 56 is opened for the predetermined period of time (the adsorption mode). However, if the adsorbed HC substantially begins to desorb before the expiration of the predetermined period of time, the bit of the flag is set to 1, indicating that the instruction to close the bypass exhaust gas passage 56 should be issued.

Accordingly, the judgement in S122 corresponds to determine whether the desorption of HC has begun. When the result is negative, since this indicates that it is still in the adsorption mode, the program proceeds to S124 in which it is determined whether the adsorbent temperature is estimated to be a predetermined temperature X.TMP.TRAP (approximately in between 50° C. to 60° C., for example). This is because the adsorbent temperature tmp.trs is maintained at a certain temperature (i.e. 50° C. to 60° C.) in the adsorption mode due to the influence of the heat of vaporization of moisture adsorbed together with HC. This estimated adsorbent temperature is hereinafter referred to as "tmphat.trs".

The program then proceeds to S126 in which the estimated adsorbent temperature tmphat.trs is rewritten as the adsorbent temperature (named "tmp.trs"). In other words, the estimated value is used as a substitution for the actual value.

Figure 18:
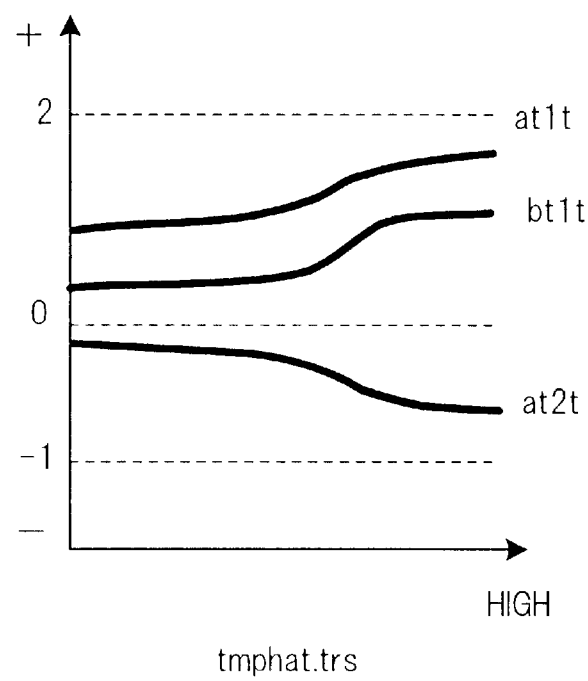
FIG. 18 is a graph showing characteristics of coefficients used in the determination of an estimated adsorbent temperature referred to in the flow chart of FIG. 12.

On the other hand, when the result in S122 is affirmative, since this indicates the desorption mode has begun, the program proceeds to S128 in which the estimated adsorbent temperature tmphat.trs is determined using a dynamic model described by an equation shown there. This determination is the same as the estimated catalyst temperature tmphat.cat. In the equation, values "at1t","at2t" and "bt1t" indicate coefficients and are determined as values ranging from −1 to +2 by retrieving data from a table (whose characteristics are shown in FIG. 18) using the estimated adsorbent temperature tmphat.trs, more precisely its last valve tmphat.trs (n−1) as address data.

Figure 19:
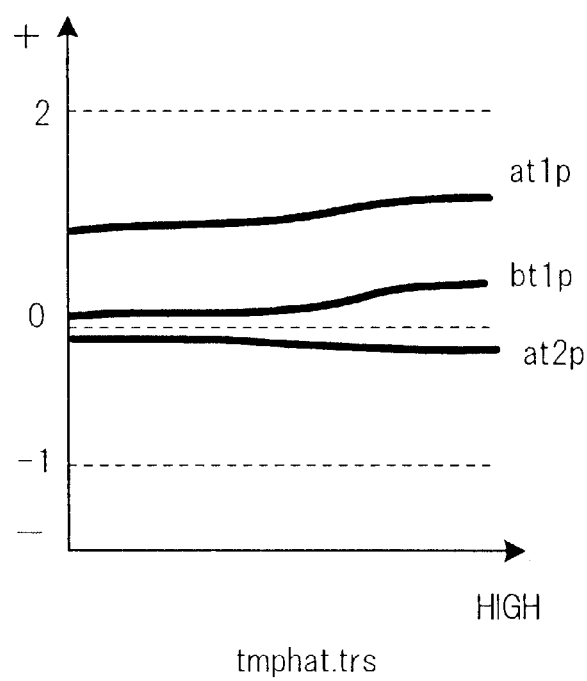
FIG. 19 is a graph showing characteristics of coefficients used in the determination of the estimated adsorbent temperature referred to in the flow chart of FIG. 12.

When the result in S120 is negative, since this indicates that the bypass exhaust gas passage 56 is kept closed, the program proceeds to S130 in which the estimated adsorbent temperature tmphat.trs is determined or calculated in a similar manner. FIG. 19 is a graph showing the characteristics of coefficients "at1p", "at2p" and "bt1p" used in the equation illustrated in S130.

Returning to the explanation of the flow chart of FIG. 11, the program proceeds to S12 in which the temperature ex.hc indicative of an aft-catalyst in-exhaust gas HC concentration is estimated. The estimated aft-catalyst in-exhaust gas HC concentration indicates the HC concentration of the exhaust gas currently generated by the engine 10 in the exhaust gas to be recirculated. In other words, this value ex.hc indicates the HC concentration (other than that of the desorbed HC) in the exhaust gas flowing downstream through the first and second catalysts 40, 42.

Figure 20:
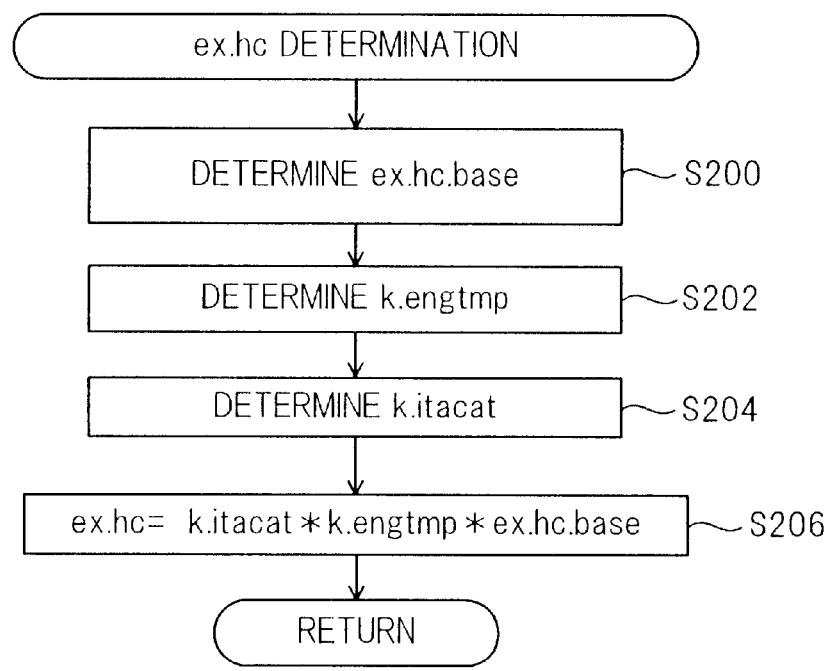
FIG. 20 is a flow chart showing the subroutine for determining an estimated aft-catalyst in-exhaust gas HC concentration referred to in the flow chart of FIG. 11.

FIG. 20 is a flow chart showing the subroutine of this.

Figure 21:
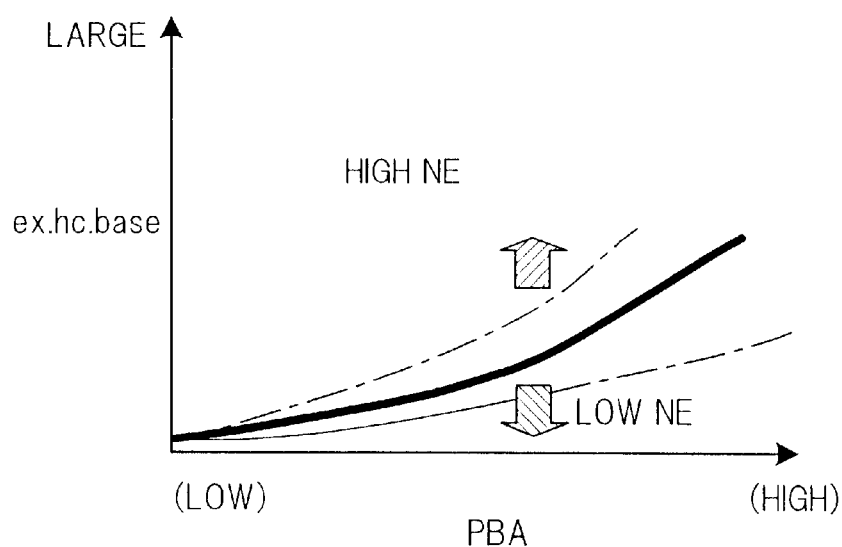
FIG. 21 is a graph showing characteristics of a basic value of the estimated aft-catalyst exhaust gas temperature referred to in the flow chart of FIG. 20.

The program begins in S200 in which a basic value of the aft-catalyst in-exhaust gas HC concentration (named "ex.hc.base") is calculated or estimated. This is done by retrieving mapped data (whose characteristics are shown in FIG. 21) using the detected engine load (manifold absolute pressure PBA) and the engine speed NE as address data. Specifically, it is retrieved using a characteristic shown by a solid line in FIG. 21 when the engine speed NE is within a range. If not, it is retrieved using an upper characteristic or a lower characteristic shown by phantom lines depending on the direction in which the engine speed NE is out of the range.

Figure 22:
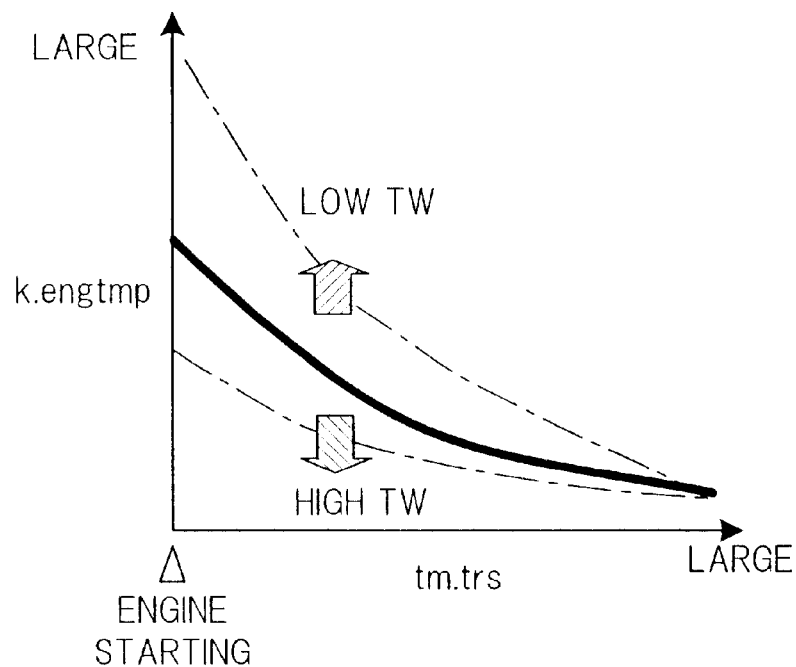
FIG. 22 is a graph showing characteristics of an engine-warmup correction coefficient k.engtmp referred to in the flow chart of FIG. 20.

The program then proceeds to S202 in which an engine-warmup correction coefficient k.engtmp is calculated. This is done by retrieving mapped data (whose characteristics are shown in FIG. 22) using the time since engine starting (the timer value tm.trs) and the detected engine coolant temperature TW. Specifically, it is retrieved using a characteristic shown by a solid line in FIG. 22 when the engine coolant temperature TW is within a range. If not, it is retrieved using an upper characteristic or a lower characteristic shown by phantom lines depending on the direction in which the engine coolant temperature TW is out of the range.

Figure 23:
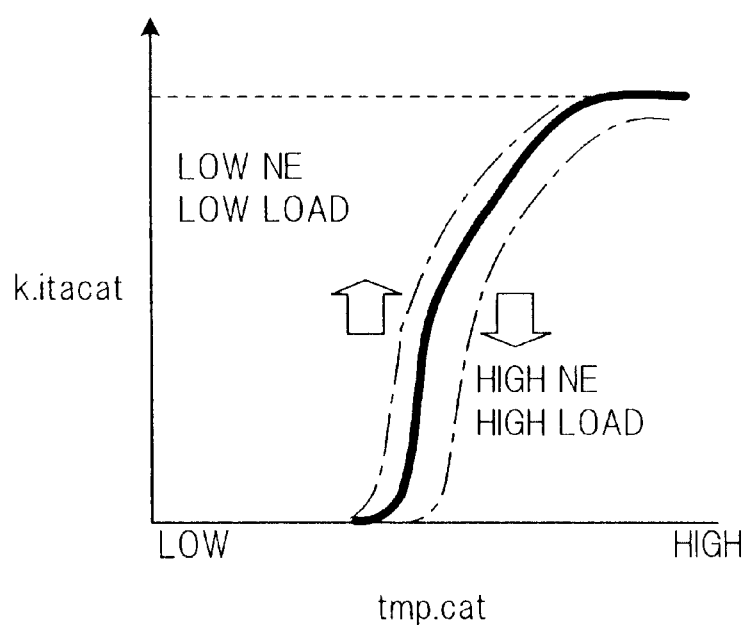
FIG. 23 is a graph showing characteristics of a catalyst purification rate referred to in the flow chart of FIG. 20.

The program then proceeds to S204 in which a catalyst purification rate k.itacat is calculated. If the value k.itacat is 1, that indicates that the purification rate is 100%. This is done by retrieving mapped data (whose characteristics are shown in FIG. 23) using the catalyst temperature tmp.cat, the detected engine speed NE and the engine load (e.g. manifold absolute pressure PBA). Since the catalyst purification rate k.itacat decreases with increasing engine speed NE and the manifold absolute pressure PBA, the characteristics of the rate are set as shown in the figure. Specifically, it is retrieved using a characteristic shown by a solid line in the figure when the engine speed NE and the manifold absolute pressure PBA are within a range. If not, it is retrieved using an upper characteristic or a lower characteristic shown by phantom lines depending on the direction in which the engine speed NE and the manifold absolute pressure PBA are out of the range.

The program then proceeds to S206 in which the basic value of the aft-catalyst in-exhaust gas HC concentration ex.hc.base is multiplied by the engine-warmup correction coefficient k.engtmp and the catalyst purification rate k.itacat to determine the product as the estimated aft-catalyst in-exhaust gas HC concentration ex.hc.

Again returning to the explanation of the flow chart of FIG. 11, the program proceeds to S14 in which the HC concentration trs.hc is determined or calculated.

Figure 24:
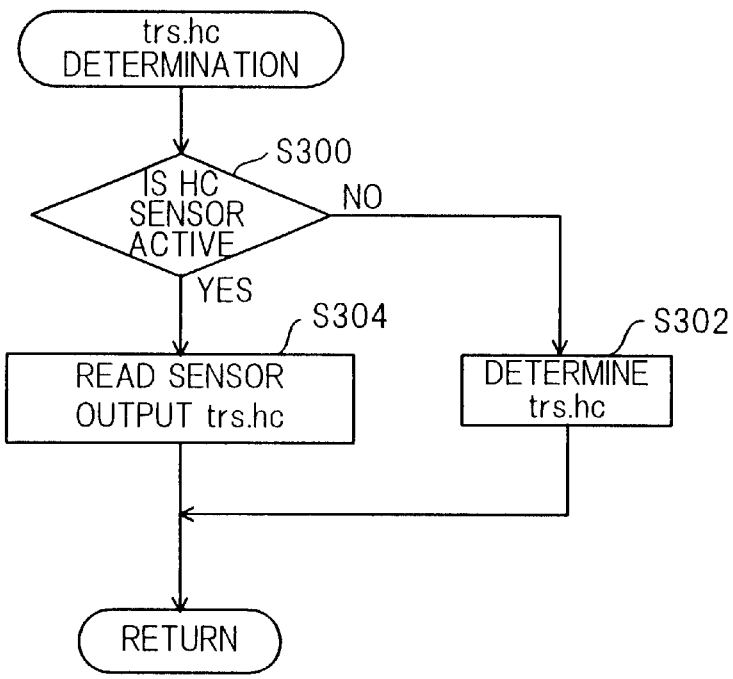
FIG. 24 is a flow chart showing the subroutine for determining the HC concentration referred to in the flow chart of FIG. 11.

FIG. 24 is a flow chart showing the subroutine for this determination.

The program begins in S300 in which it is determined whether the HC sensor 104 is active. Since the HC sensor 104 has not been activated until the ambient temperature rises to a predetermined value, this is done by measuring time lapse since engine starting and when the measured time has not reached a prescribed time, it is determined that the HC sensor 104 is not active.

Figure 25:
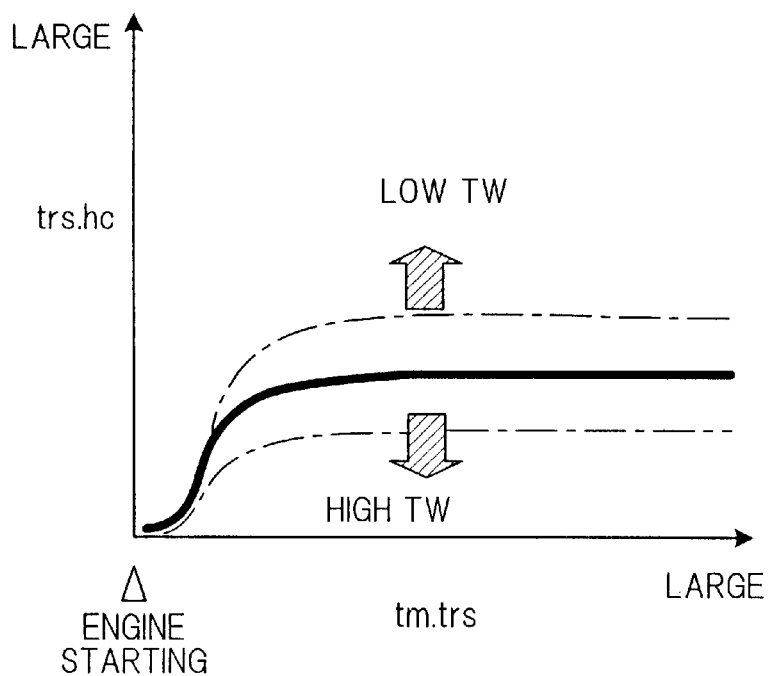
FIG. 25 is a graph showing characteristics of the HC concentration referred to in the flow chart of FIG. 24.

When the result in S300 is negative, the program proceeds to S302 in which the HC concentration trs.hc is estimated (calculated) by retrieving mapped data (whose characteristics are shown in FIG. 25) using the measured time since engine starting (i.e. the timer value tm.trs) and the detected engine coolant temperature TW as address data.

To be more specific, the HC concentration trs.hc is retrieved using a characteristic shown by a solid line in the figure when the detected engine coolant temperature TW is within a range. On the other hand, trs.hc is retrieved using upper characteristics shown by phantom lines when the detected engine coolant temperature TW is out of the range in the lower direction, while trs.hc is retrieved using lower characteristics shown by phantom lines when the detected engine coolant temperature TW is out of the range in the higher direction.

In the characteristics shown in FIG. 25, the reason why trs.hc is set to be larger at a low TW than that at a high TW, is that, the amount of HC (i.e. HC concentration) in the exhaust gas increases when the engine 10 is cold. Thus, since the substitute value is calculated in S302 when the result in S300 is negative, the influence of inactiveness of the HC sensor 104 can be reduced as least as possible. On the other hand, when the result in S300 is affirmative, the program proceeds to S304 in which the HC concentration trs.hc is simply determined by reading the output of the HC sensor 104.

Returning to the explanation of FIG. 11, the program proceeds to S16 in which the times (named "tm.trs.ch1, 2") defining a degradation discrimination period are determined. As illustrated in FIG. 9, tm.trs.ch1 indicates the time at which the degradation discrimination should be initiated and tm.trs.ch2 indicates the time at which the degradation discrimination should be terminated.

Figure 26:
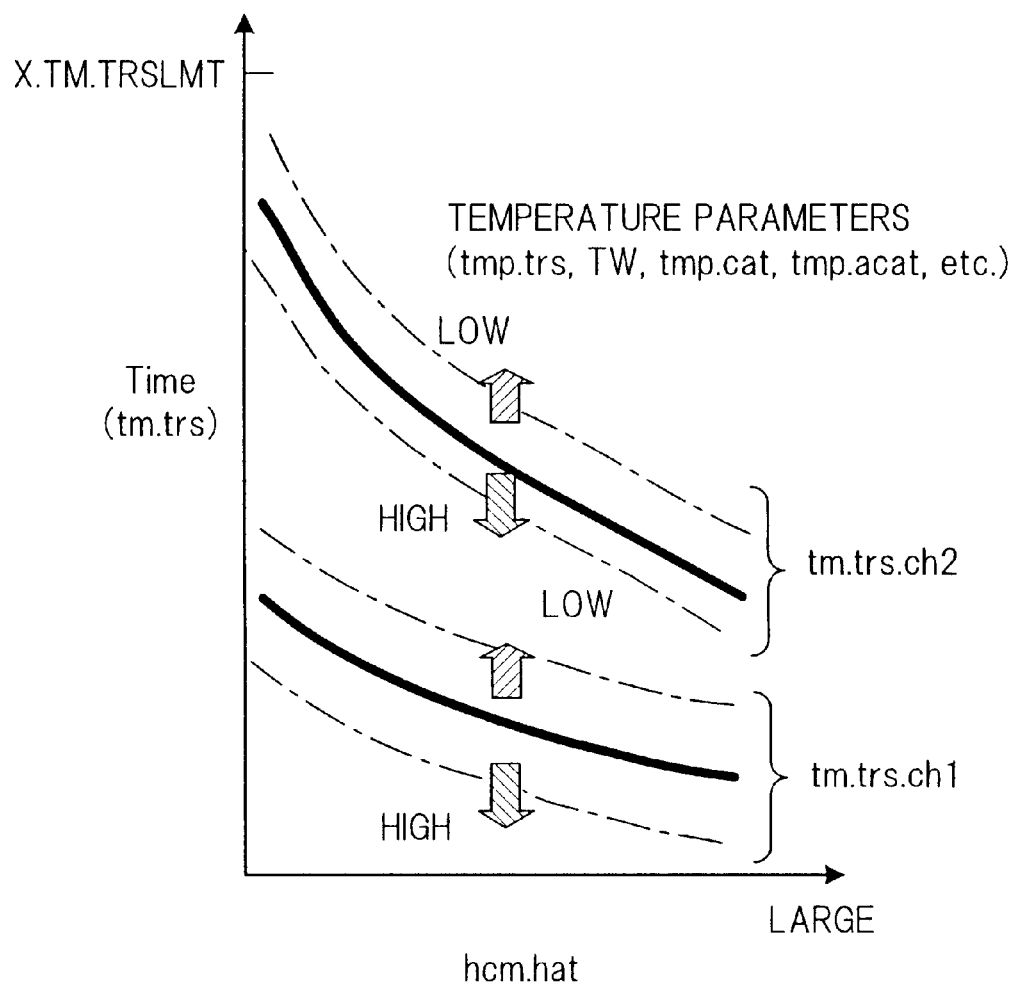
FIG. 26 is a graph showing characteristics of times defining a degradation discrimination period referred to in the flow chart of FIG. 11.

The determination of tm.trs.ch1, 2 is done by retrieving mapped data (whose characteristics are shown in FIG. 26) using an estimated adsorbed HC amount (named "hcm.hat") and one from among the parameters relating to the adsorbent temperature. It should be noted that the values tm.trs.ch1, 2 are determined such that the degradation discrimination period is present after the HC sensor 104 has been activated.

The value hcm.hat is the amount of HC estimated to be adsorbed in the adsorbent 74. In the first program loop, the last value stored in a backup portion of the RAM 124 before the engine 10 was stopped is used in the first program loop of the flow chart of FIG. 11.

As the adsorbent temperature parameter, the adsorbent temperature tmp.trs should preferably be used. However, it is alternatively possible to use another value such as the engine coolant temperature TW, the catalyst temperature tmp.cat, the aft-catalyst exhaust gas temperature tmp.acat, etc. As will be explained later, the estimated adsorbed HC amount hcm.hat is decreased in response to the desorption (purging) of the adsorbed HC and set to zero when the desorption (purging) has been completed.

In FIG. 26, a value X.TM.TRSLMT in the ordinate indicative of time axis defined by the time since engine starting (the timer value tm.trs) means the aforesaid predetermined period of time defining the adsorption mode.

It should be noted, that a value or parameter having the prefix "X" in this specification and corresponding figures indicates a predetermined value or parameter.

In the flow chart of FIG. 11, the program proceeds to S18 in which it is determined whether the engine 10 has started. This is done by determining whether the engine 10 has started cranking and the fuel injection has been started. If the cranking has started, but the fuel injection has not, it is determined that the engine 10 has not started.

The result in S18 is normally negative in the first program loop and the program proceeds to S20 in which the timer value tm.trs is reset to zero. The program then proceeds to S22 in which it is determined whether the bit of a flag f.hctrs.on is set to 1. To set the bit of the flag to 1 indicates to issue the instruction to operate the switch-over valve 60 such that the bypass exhaust gas passage 56 is opened, while to reset it to 0 indicates to generate the instruction to operate the valve 60 such that the bypass exhaust gas passage 56 is closed. In S22, the instruction is generated to operate the switch-over valve 60 to open the bypass exhaust gas passage 56 to begin the HC adsorption and enters the adsorption mode and the program is once terminated. The operation of the switch-over valve 60 itself is conducted by the ECU 114 through the valve actuator 64 in a routine (not shown).

When the result in S18 is affirmative in the next or later program loop, the program proceeds to S24 in which it is determined whether the flag f.hctrs.on is set to 1, more precisely it is in the adsorption mode. The result is normally affirmative in the first program loop, the program proceeds to S26 in which adsorbed HC amount hcm.hat is estimated or determined.

Figure 27:
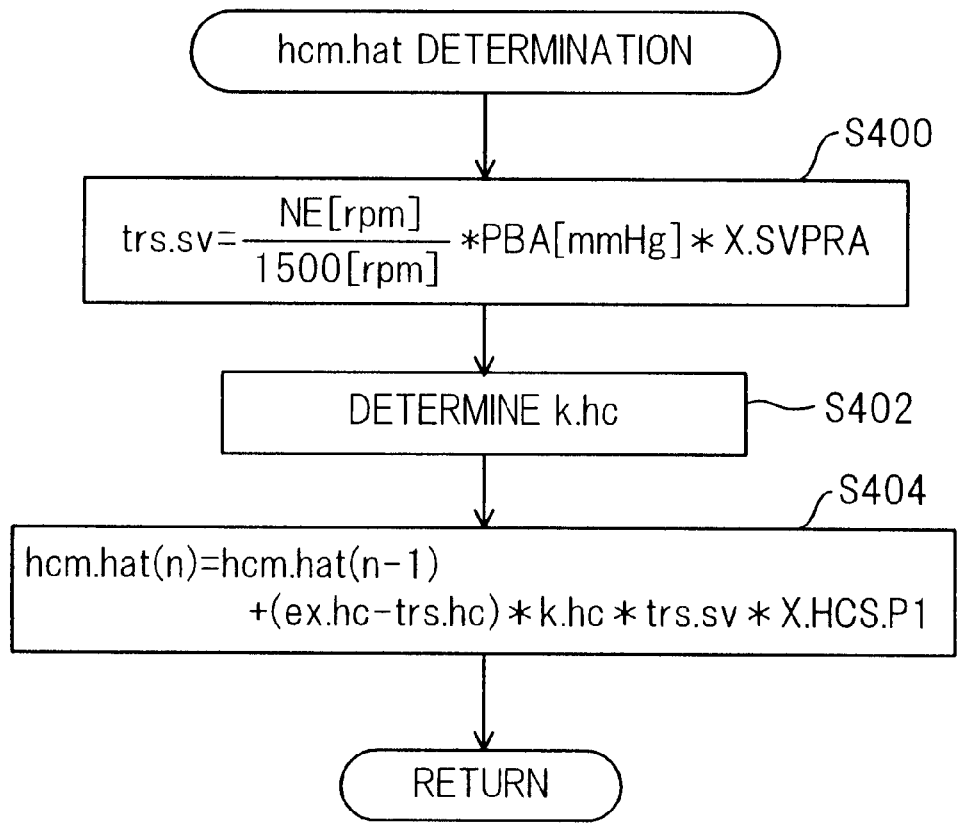
FIG. 27 is a flow chart showing the subroutine for determining an estimated adsorbed HC amount referred to in the flow chart of FIG. 11.

FIG. 27 is a flow chart showing the subroutine for this estimation.

The program begins in S400 in which the exhaust gas volume (named "trs.sv") in terms of a space velocity through the adsorbent, is estimated or determined using an equation illustrated there. The equation is an approximation using a value X.SVPRA. The value X.SVPRA is, for example, 65.74 assuming that the displacement volume of the engine 10 is 2.2 liters. The exhaust gas volume trs.sv may alternatively be estimated based on another equation using the engine speed NE and the fuel injection amount TI.

Figure 28:
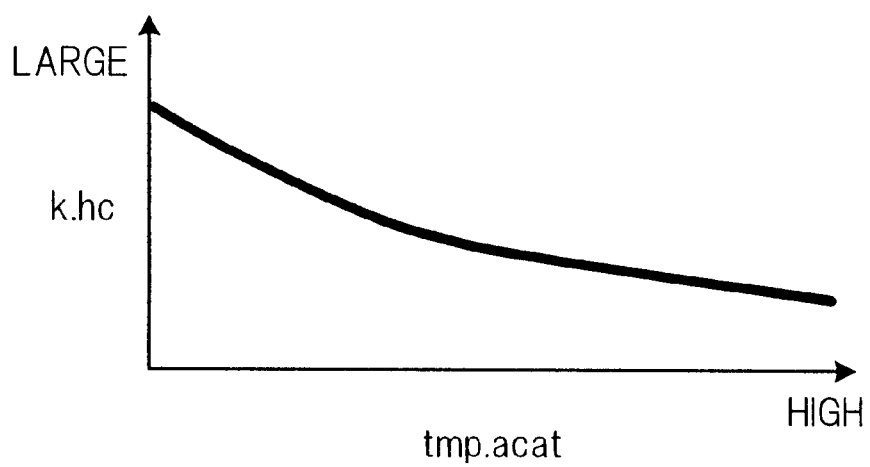
FIG. 28 is a graph showing a characteristic of an HC density correction coefficient referred to in the flow chart of FIG. 27.

The program then proceeds to S402 in which an HC density correction coefficient k.hc is determined or calculated by retrieving table data (whose characteristic is shown in FIG. 28) using the estimated aft-catalyst exhaust gas temperature tmphat.acat as address data.

The program then proceeds to S404 in which the estimated adsorbed HC amount hcm.hat is determined or calculated using an equation illustrated there. As mentioned above, the estimated adsorbed HC amount hcm.hat (initially set to zero) indicates the total amount of HC estimated to be adsorbed in the adsorbent 74.

In the equation illustrated in S404, X.HCS.P1 is a correction coefficient to be varied with the position of the HC sensor 104. When the HC sensor 104 is located at the position shown in FIG. 1, the value X.HCS.P1 should be larger than 1. To be more specific, assuming X.HCS.P1 is 1 when the HC sensor 104 is located at a point downstream (in terms of the exhaust gas stream in the adsorption mode) of the adsorbent 74, i.e. in the right in FIG. 1, the HC sensor 104 or 104a that is located at a position in the upstream side is set to an appropriate value larger than 1. The determined value hcm.hat is stored in the backup portion of the RAM 124 and is kept there after the engine 10 has been stopped.

Returning to the explanation of FIG. 11, the program proceeds to S28 in which the timer value tm.trs is incremented by a prescribed amount X.T M.TRSJUD. In other words, the measurement of time laps after engine starting is started.

The program then proceeds to S30 in which it is determined whether the value of the timer tm.trs has reached the aforesaid value X.TM.TRSLMT. The result is normally negative in the first program loop and the program proceeds to S32 in which it is determined whether the detected HC concentration trs.hc is greater than an appropriately set threshold value X.HC.TRSLMT.

As mentioned above with reference to FIG. 8, the detected HC concentration is relatively low in the adsorption mode since the flowing HC is adsorbed to the adsorbent 74, but becomes larger when the desorption begins. From this, it can be determined whether the desorption of HC substantially begins by comparing the detected HC concentration trs.hc with the threshold value X.HC.TRSLMT and by determining if the detected value trs.hc exceeds the threshold value X.HC.TRSLMT.

When the result in S32 is negative, since this indicates that desorption has not begun, the program proceeds to S34 in which the threshold value (for degradation discrimination) trs.hc.agd is determined or calculated (explained later), and to S36 in which it is determined whether the timer value tm.trs is within the range (degradation discrimination period) defined by the times tm.trs.ch1, 2. When the result is affirmative, the program proceeds to S38 in which it is discriminated whether the adsorbent 74 has degraded (explained later). On the other hand, when the result is negative, the program skips S38 and proceeds to S22.

On the other hand, when the result in S32 is affirmative, the program proceeds to S40 in which the bit of the flag f.hc.pg is set to 1, and to S42 in which a desorption-beginning-determination timer (named "tm.trs.full(n)") is incremented by a prescribed amount X.TM.TRSJUD, to S44 in which it is determined whether the value of the timer is greater or equal to a threshold value X.TMFULL.D. When the result is negative, the program proceeds to S22. When the result is affirmative, the program proceeds to S46 in which the bit of the flag f.hctrs.on is reset to 0 such that the bypass exhaust gas passage 56 is closed. The same will also be applied if the result in S30 is affirmative.

Thus, by comparing the detected HC concentration with the threshold value, it can be determined if the adsorption mode has terminated and if it does, the bypass exhaust gas passage 56 is closed, thereby enabling to prevent the desorbed HC from flowing out downstream. Moreover, by providing a delay time X.TMFULL.D, the termination of the adsorption mode can be determined more accurately.

In the flow chart of FIG. 11, the determination of the threshold value trs.hc.agd mentioned in S34 will be explained.

Figure 29:
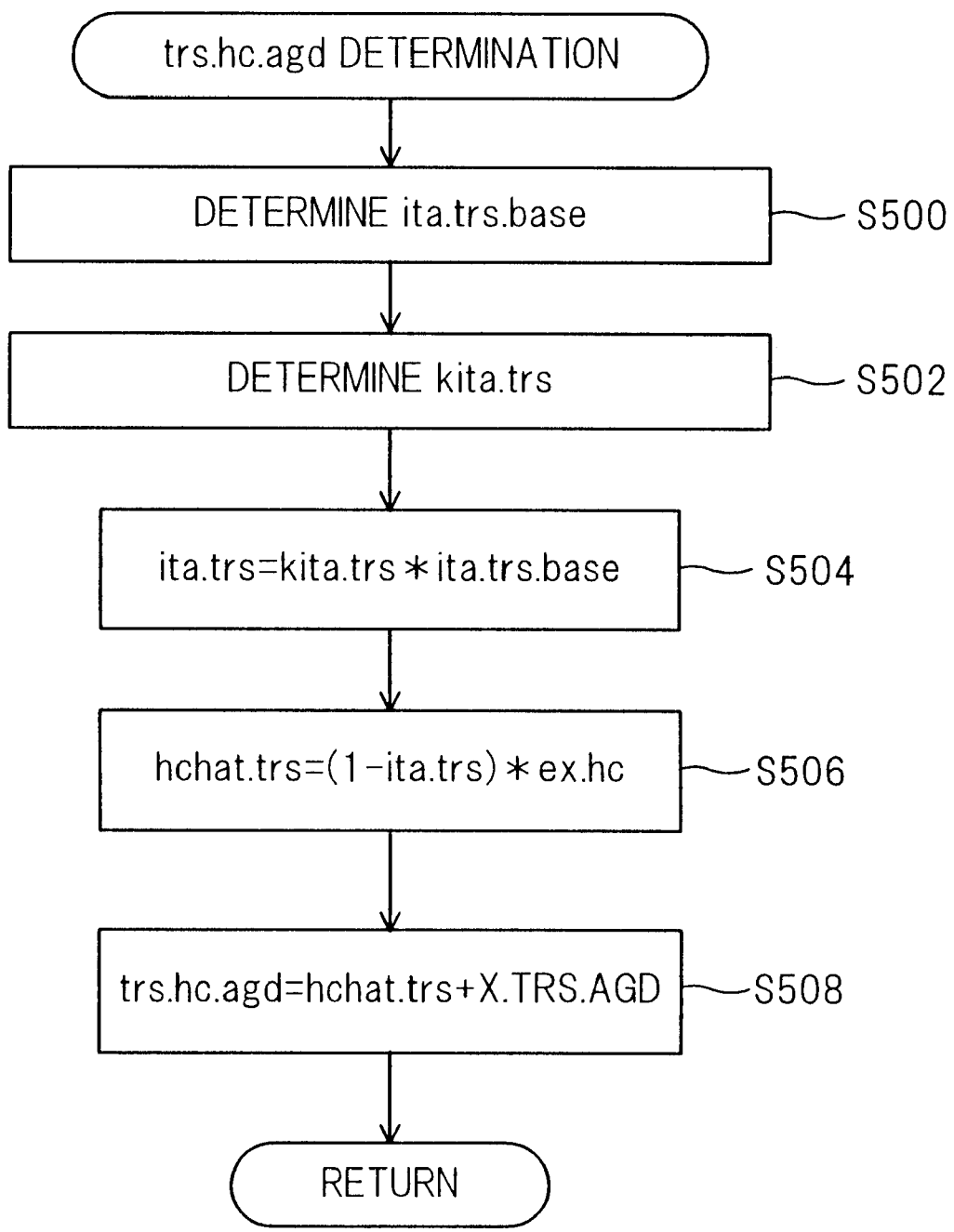
FIG. 29 is a flow chart showing the subroutine for determining a threshold value to be used for discriminating degradation referred to in the flow chart of FIG. 11.

FIG. 29 is a flow chart showing the subroutine of this.

Figure 30:
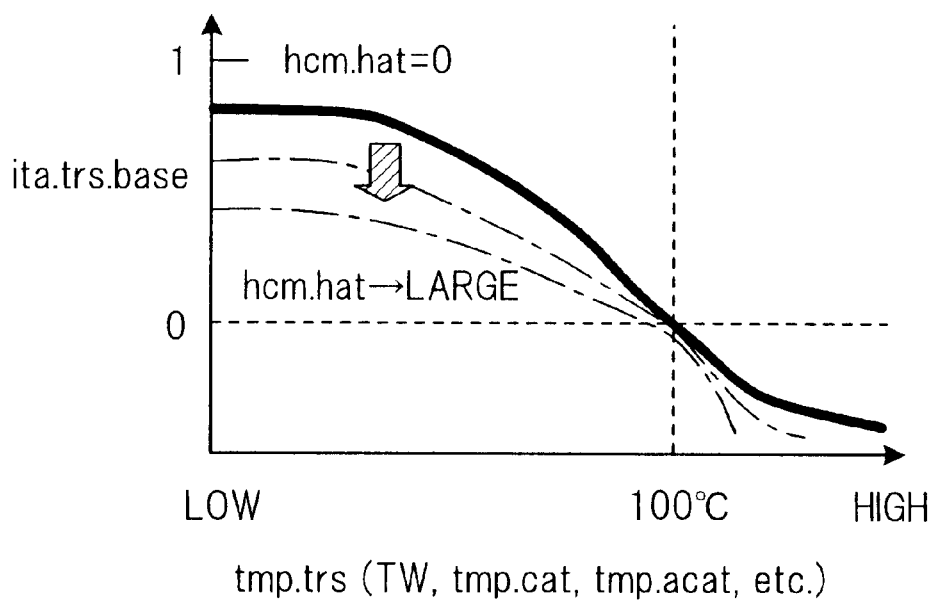
FIG. 30 is a graph showing characteristics of a basic value of an adsorbent adsorption rate referred to in the flow chart of FIG. 29.

The program begins in S500 in which a basic value of the adsorption rate of the adsorbent 74 (named "ita.trs.base") is determined or calculated. This is done by retrieving mapped data (whose characteristics are shown in FIG. 30) using the adsorbent temperature parameter and the estimated adsorbed HC amount hcm.hat as address data. Specifically, this is done by retrieving a characteristic shown by a solid line in FIG. 30 when the estimated adsorbed HC amount hcm.hat is zero. If hcm.hat is larger than zero, it is retrieved using one of the characteristics shown by phantom lines depending on the magnitude.

Since the adsorption rate basic value ita.trs.base varies with the adsorbent temperature, the value is retrieved using the adsorbent temperature parameter. As the adsorbent temperature parameter, the adsorbent temperature tmp.trs is used. However, it is alternatively possible to use another value such as the engine coolant temperature TW, the catalyst temperature tmp.cat, the aft-catalyst exhaust gas temperature tmp.acat, etc.

Figure 31:
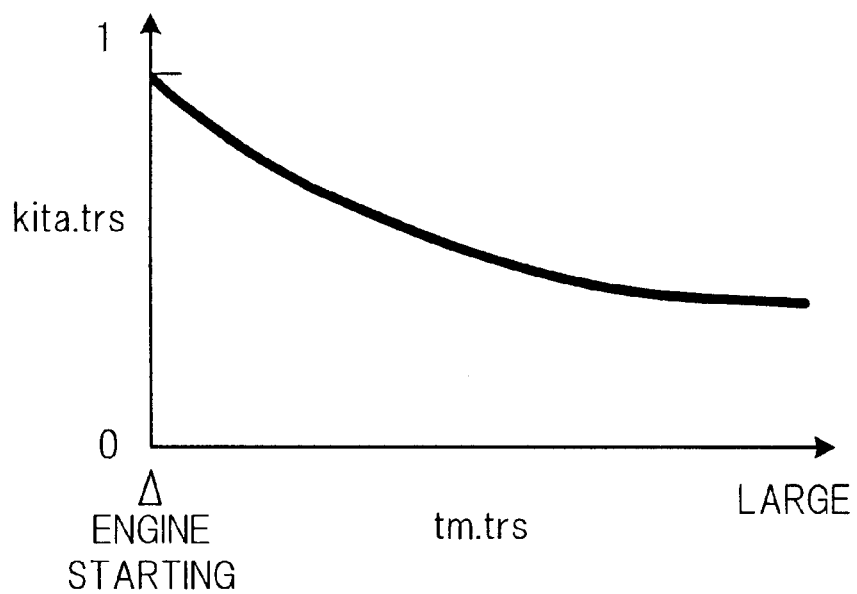
FIG. 31 is a graph showing characteristics of a correction coefficient of the adsorbent adsorption rate referred to in the flow chart of FIG. 29.

The program then proceeds to S502 in which an adsorber-adsorbing-rate correction coefficient kita.trs is calculated. This is done by retrieving table data (whose characteristics are shown in FIG. 31) using the time since engine starting (the timer value tm.trs) as address data.

The program then proceeds to S504 in which the calculated basic value ita.trs.base is multiplied by the correction coefficient kita.trs to determine an adsorbent adsorption rate ita.trs. The rate indicates the adsorption rate of the adsorbent 74 and if it is 1, that indicates that the adsorption rate is 100%.

The program then proceeds to S506 in which the difference between 1 and the calculated rate is calculated and the difference is multiplied by the estimated in-exhaust gas HC concentration ex.hc to determine a value hchat.trs. This value hchat.trs indicates an estimated HC concentration at the rear end of the adsorber 74 or at a position downstream of the adsorbent 74.

The program then proceeds to S508 in which a predetermined value X.TRS.AGD (positive value) is added to the estimated aft-adsorber HC concentration hchat.trs and the sum is determined as the threshold value (for degradation discrimination) trs.hc.agd. In order to improve the discrimination accuracy, the estimated aft-adsorbent HC concentration is not immediately used. Instead, the predetermined value X.TRS.AGD is added thereto. The predetermined value X.TRS.AGD may be varied with the time since engine starting (timer value tm.trs) or the adsorbent temperature parameter such as the adsorbent temperature tmp.trs.

In the flow chart of FIG. 11, the discrimination of adsorbent degradation mentioned in S38 will be explained. As will be understood from the figure, this discrimination is conducted when it is within the degradation discrimination period in the adsorption mode.

Figure 32:
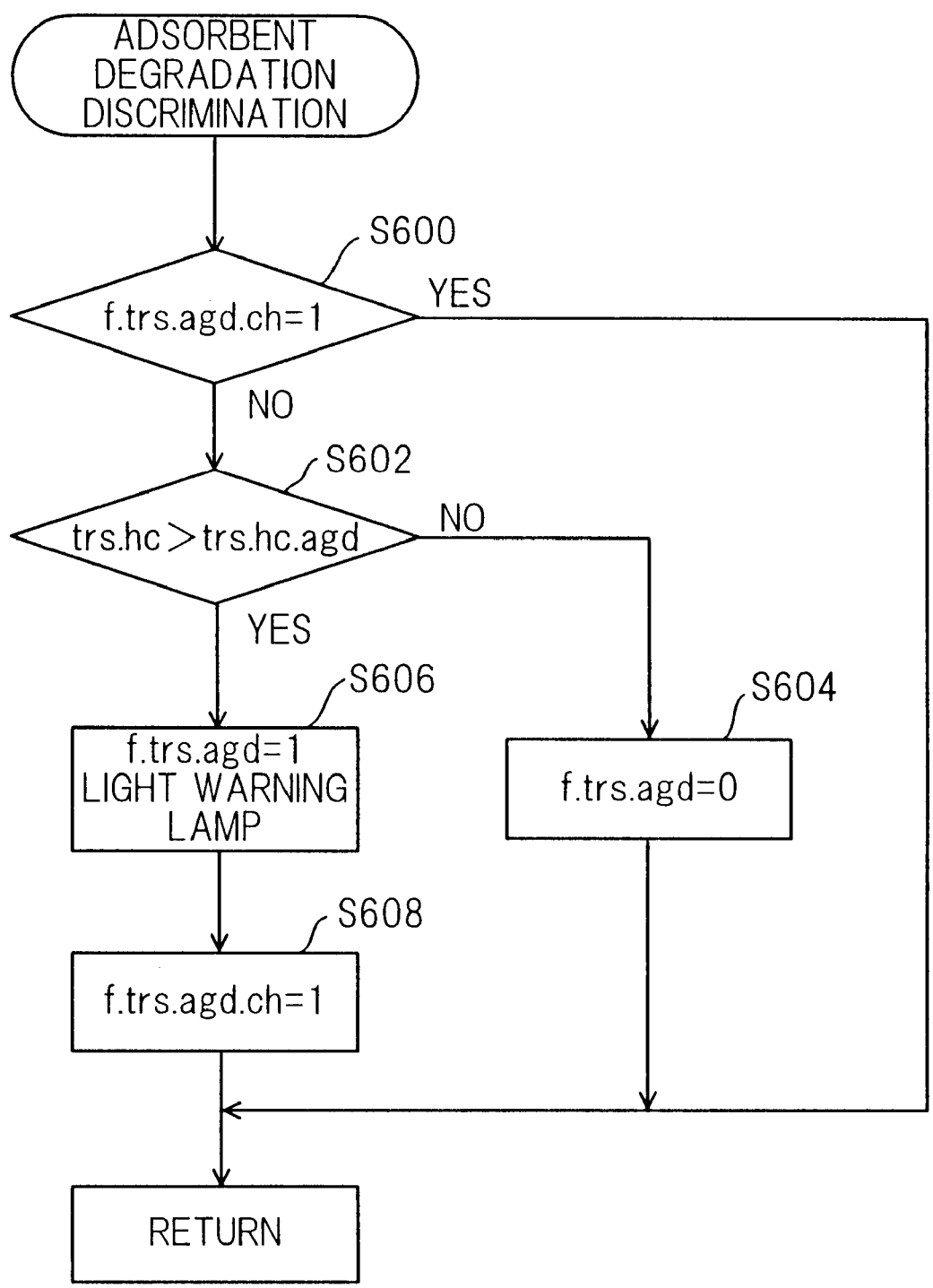
FIG. 32 is a flow chart showing the subroutine for determining the adsorbent degradation referred to in the flow chart of FIG. 11.

FIG. 32 is a flow chart showing the subroutine for this discrimination.

The program begins in S600 in which it is determined whether the bit of a discrimination-execution flag (named "ftrs.agd.ch") is set to 1. Since the bit of the flag is initially reset to 0 and is set to 1 when the adsorbent 74 has been discriminated to ge degradeed, the procedure in this step amounts for determining whether the adsorbent 74 has been discriminated to be degraded.

When the result in S600 is affirmative, the program is immediately terminated. When the result is negative, the program proceeds to S602 in which it is determined whether the detected HC concentration trs.hc is greater than or exceeds the threshold value trs.hc.agd.

When the result in S602 is negative, since it can be determined that the adsorbent 74 has not degraded or deteriorated, the program proceeds to S604 in which the bit of the flag f.trs.agd is reset to 0.

On the other hand, when the result in S602 is affirmative, since it can be determined that the ability or capacity of the adsorbent 74 degrades or deteriorates and hence, the adsorbent 74 has degraded or deteriorated as mentioned with reference to FIG. 10, the program proceeds to S606 in which the bit of a flag f.trs.agd is set to 1 and the warning lamp 144 lit to inform the result to the operator.

The program then proceeds to S608 in which the bit of the flag f.trs.agd.ch is set to 1. With this, the result in S600 in the next or later program loop is affirmative and the program is immediately terminated. Thus, since the adsorbent 74 was once discriminatated to be deraded, the discrimination will no longer be repeated in this vehicle trip.

Returning to the explanation of the flow chart of FIG. 11, when the result in S24 is negative, the program proceeds to S48 in which it is discriminated whether the purging (recirculating) of desorbed HC has been completed.

Figure 33:
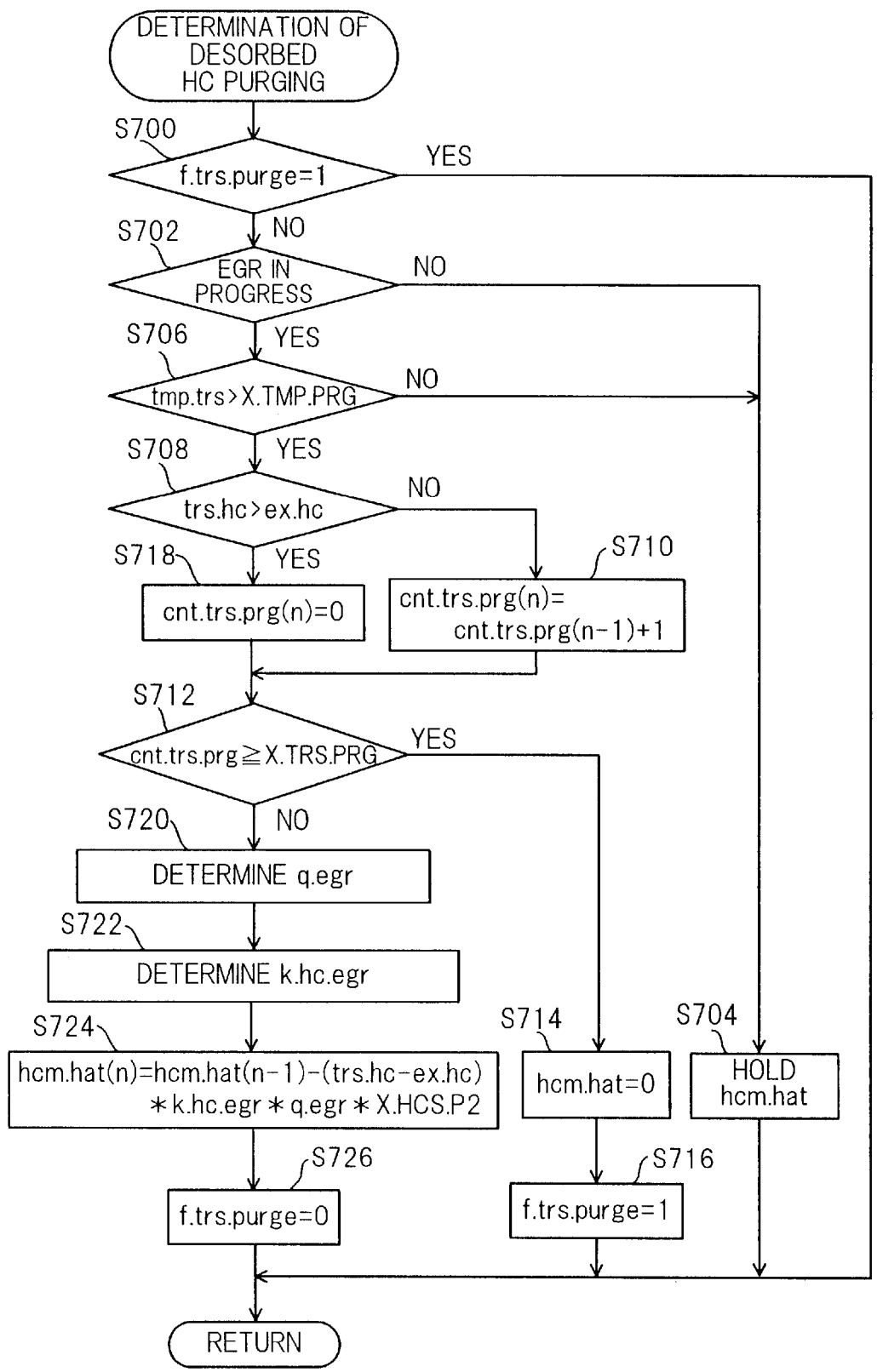
FIG. 33 is a flow chart showing the subroutine for determining the completion of purging of desorbed HC referred to in the flow chart of FIG. 11.

FIG. 33 is a flow chart showing the subroutine for this discrimination.

The program begins in S700 in which it is determined whether the bit of a purging-completion-determination flag f.trs.purge is set to 1 and if the result is affirmative, the program is immediately terminated. Since the bit of the flag is set to 1 when the purging (recirculating) of the desorbed HC has been completed, the result is normally negative in the first program loop and the program proceeds to S702 in which it is determined whether the EGR (Exhaust Gas Recirculation) operation is in progress.

The EGR is determined to be operative or inoperative, in another routine, based on the main engine parameters (defined by the engine speed NE and the engine load (manifold absolute pressure PBA) and the engine warmup condition (determined from the engine coolant temperature TW)), in view of other engine operating conditions (such as whether the engine 10 is under idling or the wide-open-throttle enrichment or the supply of fuel is cut off, etc).

When the result in S702 is negative, since the purging is only conducted when the EGR operation is in progress, the program proceeds to S704 in which the estimated adsorbed HC amount hcm.hat is held or maintained. On the other hand, when the result in S702 is affirmative, since it can be determined that the purging is in progress, the program proceeds to S706 in which it is determined whether the adsorbent temperature tmp.trs is greater than or exceeds a threshold value X. TMP.PRG to determine whether the desorption (purging) has substantially begun for the reason mentioned above. The threshold value X.TMP.PRG is set to a temperature ranging from 250° C. to 400° C., for example, for the adsorbent 74 used in this embodiment.

When the result in S706 is negative, since this indicates that the purging has not begun, the program proceeds to S704. On the other hand, when the result in S706 is affirmative, the program proceeds to S708 in which it is determined whether the detected HC concentration trs.hc is greater than the estimated in-exhaust gas HC concentration ex.hc. When the result is negative, the program proceeds to S710 in which a counter value (named "cnt.trs.prg"), more precisely its last time value cnt.trs.prg(n−1) is incremented to be updated, to S712 in which it is determined whether the current counter value cnt.trs.prg(n) is greater or equal to a threshold value for discriminating purge completion (named "X.TRS.PRG").

When the result in S712 is affirmative, since it can be determined that the purging has been completed (the desorbed HC has been wholly recirculated), the program proceeds to S714 in which the estimated adsorbed HC amount hcm.hat is set to zero. With this, it can prevent estimation errors from being accumulated. The program then proceeds to S716 in which the purge-completion-determination flag f.trs.purge is set to 1.

Explaining this, the fact that the detected HC concentration trs.hc is less than or equal to the HC concentration of exhaust gas newly flowing, would indicate the purging has terminated. In order to make sure, however, it is, as a precaution, checked whether this condition continues for a predetermined period of time (in program loops, i.e. X.TRS.PRG) and when it does, it is determined that the purging has been completed. With this, it becomes possible to determine the completion of purging.

On the other hand, when the result in S708 is affirmative, since this indicates that the purging has not been completed, the program proceeds to S718 in which the counter value is reset to zero. This will be the same when the counter value is once incremented in S710, but is negative in this step in the next or later program loop.

Figure 34:
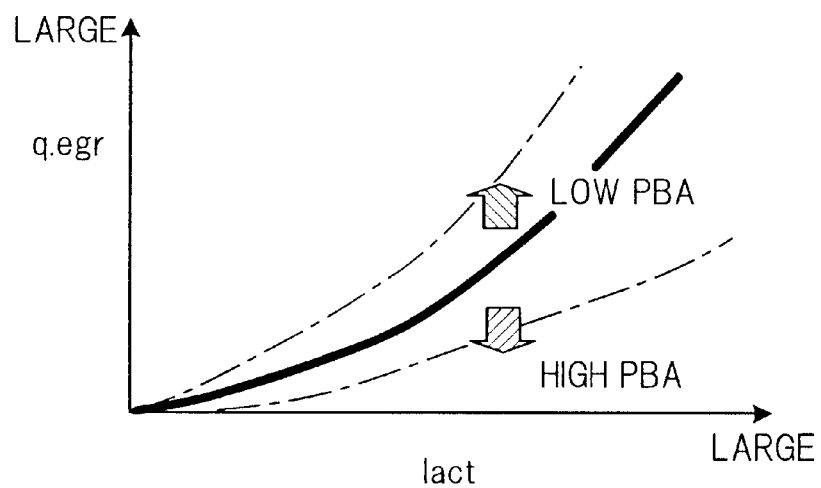
FIG. 34 is a graph showing characteristics of an EGR flow rate referred to in the flow chart of FIG. 33.

When the result is S712 is negative, the program proceeds to S720 in which the EGR flow rate q.egr is estimated or determined. The value q.egr indicates the total amount of recirculated exhaust gas including the desorbed HC. The value ex.hc is determined by retrieving table data (whose characteristics are shown in FIG. 34) using the detected EGR control valve lift amount lact as address data. Specifically, it is retrieved using a characteristic shown by a solid line in FIG. 34.

It is alternatively possible to configure such that the value q.egr is retrieved using the characteristic illustrated by the solid line when the engine load (manifold absolute pressure PBA) is within a range and if not, it is retrieved using an upper characteristic or a lower characteristic shown by phantom lines depending on the direction in which the engine load (manifold absolute pressure PBA) is out of the range. Further, instead of the detected EGR control valve lift amount lact, a command value thereto may be used.

Figure 35:
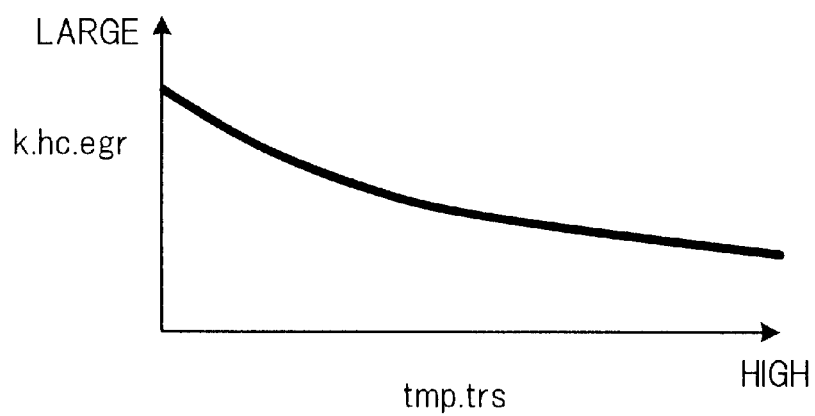
FIG. 35 is a graph showing characteristics of an HC density correction coefficient referred to in the flow chart of FIG. 33.

The program then proceeds to S722 in which the HC density correction coefficient (during EGR) k.hc.egr is determined or calculated. This is done by retrieving table data (whose characteristic is shown in FIG. 35) using the estimated adsorbent temperature tmp.trs as address data.

The program then proceeds to S724 in which the estimated adsorbed HC amount hcm.hat is again determined or corrected using an equation illustrated there. The determined value is similarly stored in the backup portion of the RAM 124 to be used in S16 in the flow chart of FIG. 11 if desired.

In the equation illustrated in S724, X.HCS.P2 is a correction coefficient similar to that of X.HCS.P1 mentioned with reference to S404 in the flow chart of FIG. 27. Here, the value X.HCS.P2 should be such that it reaches 1 as the location of HC sensor is at a more downstream position (in terms of the exhaust gas stream in the desorption mode; in the left in FIG. 1). In other words, X.HCS.P2 should be decreased as the sensor location is moved to the entrance of the EGR conduit 82.

The program then proceeds to S726 in which the bit of the purge-completion-determination flag f.trs.purge is reset to 0.

Since the degradation discrimination system for an internal combustion engine exhaust gas purification system according to this embodiment is configured to monitor the behavior of the HC through the HC sensor 104 and to determine the HC concentration trs.hc in the adsorption mode such that it should be compared with the threshold value trs.hc.agd to discriminate whether the adsorbent 74 has degraded or deteriorated, the system can discriminate the occurrence of adsorbent degradation with accuracy. Since the system needs no calculation of HC amount (mass), the system can prevent any calculation error from occurring.

Further, since the system is configured to determine the threshold value trs.hc.agd using the adsorbent temperature parameter such as the adsorbent temperature tmp.trs, the system can determine the threshold value accurately, thereby enabling to improve the degradation discrimination accuracy.

Furthermore, since the system is configured to determine the threshold value trs.hc.agd using the estimated adsorbed HC amount, the system can determine the threshold value accurately, thereby enabling to improve the degradation discrimination accuracy. Since the threshold value is corrected by the time since engine starting (tm.trs), this makes it possible to describe the change in the adsorption rate of adsorbent with respect to time, thereby enhancing the degradation discrimination accuracy.

Furthermore, since the system is configured to determine the threshold value trs.hc.agd using the estimated aft-catalyst HC concentration, the system can determine the threshold value accurately, thereby enabling to improve the degradation discrimination accuracy.

Furthermore, since the system is configured to conduct the degradation discrimination in the period defined by tm.trs.ch1,2 and to determine the period based on the parameter relating to the temperature of the adsorbent 74 and the estimated adsorbed HC amount hcm.hat, the system can conduct the degradation at a time suitable for that after the HC sensor 104 has been activated, thereby enabling to improve the degradation discrimination accuracy.

Furthermore, since the system is configured to determine the estimated adsorbed HC amount hcm.hat using the difference between the HC concentration trs.hc and the estimated in-exhaust gas HC concentration ex.hc as disclosed in S404 in the flow chart of FIG. 27 (and in S724 in the flow chart of FIG. 33), the system can determine the estimated adsorbed HC amount accurately, thereby enabling to improve the degradation discrimination accuracy.

Furthermore, since the system is configured to use a substitution value as the detected HC concentration determined based on the engine coolant temperature TW and the time since engine starting (tm.trs), the system can determine the estimated adsorbed HC amount accurately, thereby enabling to improve the degradation discrimination accuracy.

Figure 36:
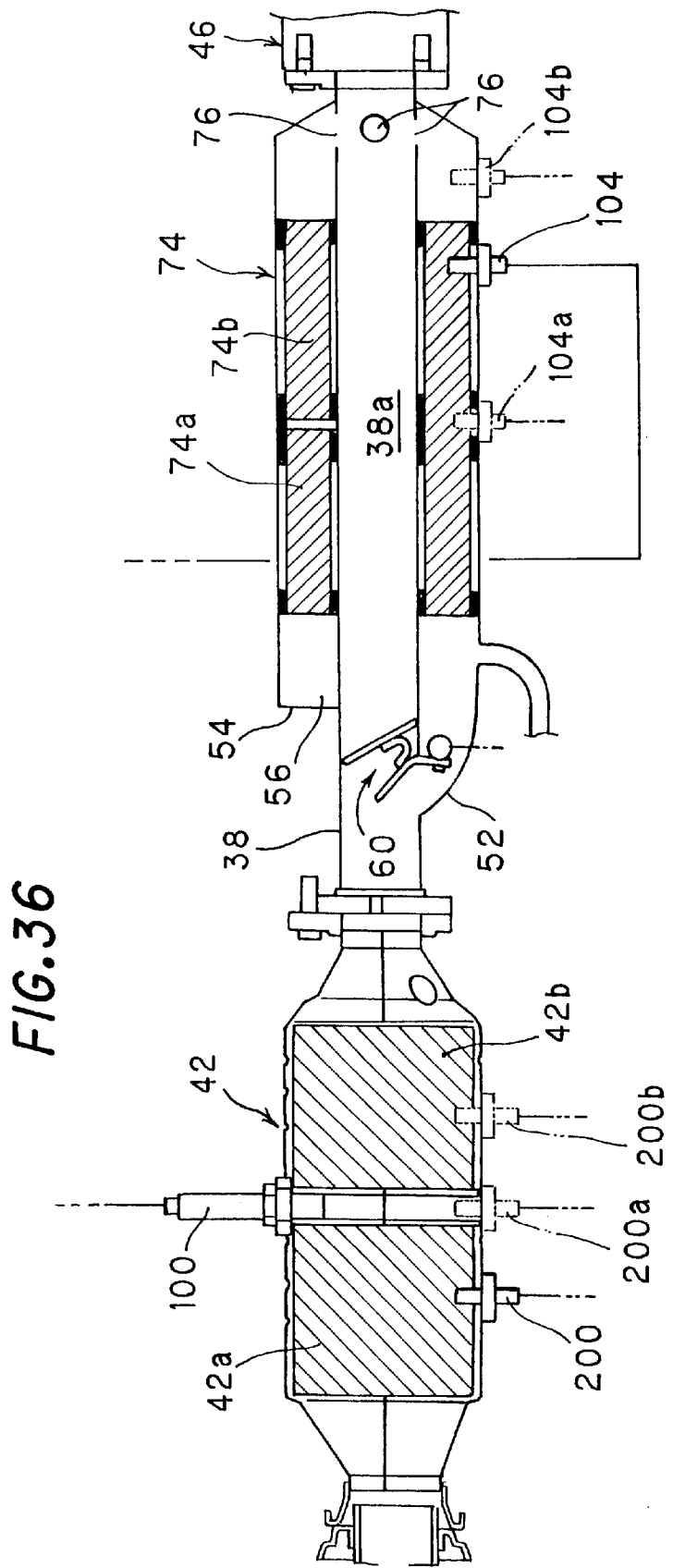
FIG. 36 is a view, partially similar to FIG. 1, but showing the configuration of the degradation discrimination system of an internal combustion engine exhaust gas purification system according to a second embodiment of this invention.

FIG. 36 is a cross sectional view of the portion downstream of the first and second catalysts 40, 42 showing a partial configuration of a degradation discrimination system of an internal combustion engine exhaust gas purification system according to a second embodiment of the invention.

In the second embodiment, as illustrated in the figure, in addition to the HC sensor 104, a temperature sensor (catalyst temperature sensor) 200 is installed at the first catalyst bed 42a of the second catalyst 42. The temperature sensor 200 generates a signal indicative of the temperature of the first catalyst bed 42a.

It is alternatively possible to install the temperature sensor 200 at a position between the first catalyst bed 42a and the second catalyst bed 42b as shown by phantom lines in the figure with the reference numeral 200a or at the second catalyst bed 42b as shown by phantom lines with the reference numeral 200b.

Explaining this with focus on the differences from the first embodiment, in the determination of the estimated temperatures in a flow chart (not shown) to FIGS. 12 and 13, the result in a step similar to S106 is affirmative and the program proceeds to a step similar to S132 in which it is determined whether the catalyst temperature sensor 200 is active.

When the result is negative, the program proceeds to a step similar to S108 in the same manner in the first embodiment. On the other hand, when the result is affirmative, the program proceeds to a step similar to S134 in which the output indicative of tmp.cat of the catalyst temperature sensor 200 is read.

In the second embodiment, thus, when the catalyst temperature sensor 200 has been activated, the sensor output is immediately read as the catalyst temperature tmp.cat, which is used, instead of the estimated value, in steps including that similar to S114 of the flow chart.

Having been configured in such a manner, the degradation discrimination system for an internal combustion engine exhaust gas purification system according to the second embodiment can further enhance the degradation discrimination accuracy. The rest of the configuration as well as the effects and advantages thereof is the same as the first embodiment.

Figure 37:
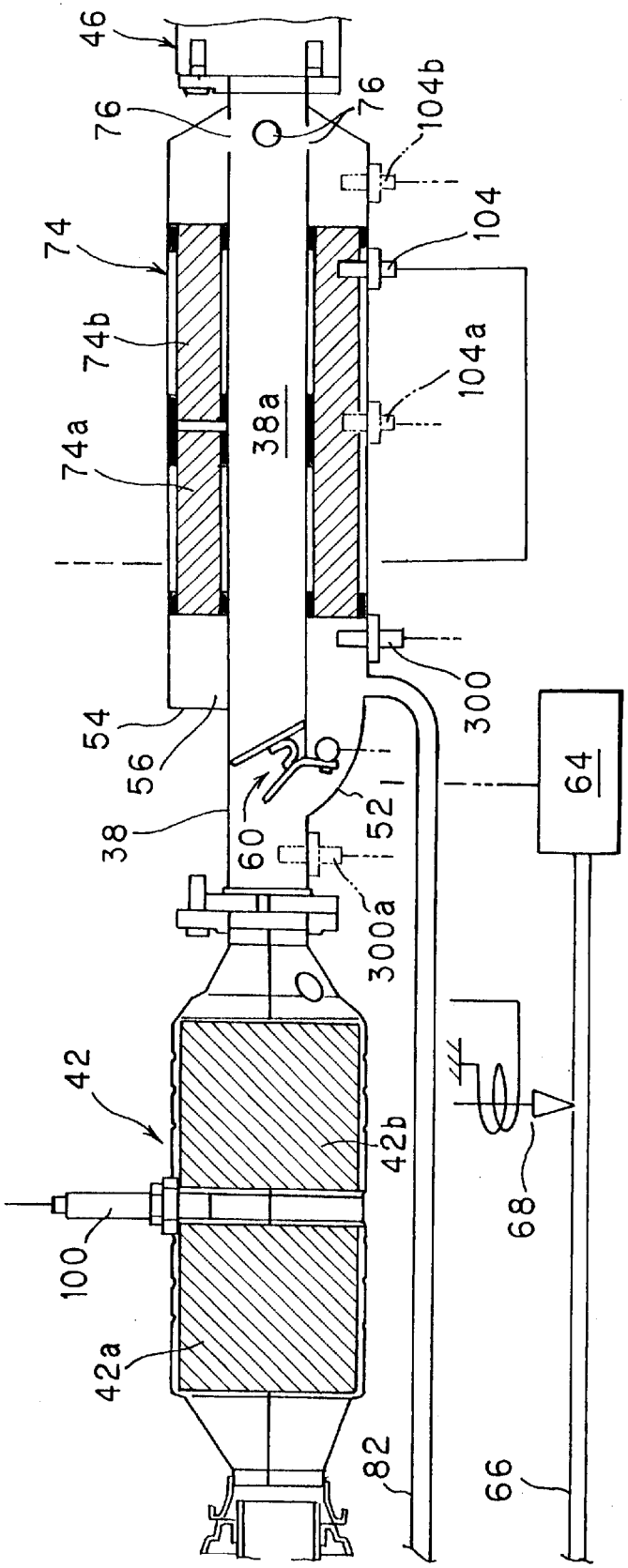
FIG. 37 is a view, partially similar to FIG. 1, but showing the configuration of the degradation discrimination system of an internal combustion engine exhaust gas purification system according to a third embodiment of this invention.

FIG. 37 is a cross sectional view of the portion downstream of the first and second catalysts 40, 42 showing a partial configuration of a degradation discrimination system of an internal combustion engine exhaust gas purification system according to a third embodiment of the invention.

In the third embodiment, as illustrated in the figure, in addition to the HC sensor 104, a temperature sensor (aft-catalyst temperature sensor) 300 is installed at a position between the switch-over valve 60 and the adsorbent 74, more precisely at a position upstream of the adsorbent (closer to the branch 52). The temperature sensor 300 generates a signal indicative of the temperature at that location downstream of the catalyst 42.

It is alternatively possible to install the temperature sensor 300 at a position between the second catalyst bed 42b and the switch-over valve 60 as shown by phantom lines in the figure with the reference numeral 300a.

Explaining this with focus on the differences from the first embodiment, in the determination of the estimated temperatures in a flow chart (not shown) to FIGS. 12 and 13, the result in a step similar to S112 is affirmative and the program proceeds to a step similar to S136 in which it is determined whether the aft-catalyst temperature sensor 300 is active.

When the result is negative, the program proceeds to a step similar to S114 in the same manner in the first embodiment. On the other hand, when the result is affirmative, the program proceeds to a step similar to S138 in which the output indicative of tmp.acat of the catalyst temperature sensor 300 is read.

In the third embodiment, thus, when the aft-catalyst temperature sensor 300 has been activated, the sensor output is immediately read as the catalyst temperature tmp.acat, which is used, instead of the estimated value, in steps including that similar to S402 in the flow chart of FIG. 27.

Having been configured in such a manner, the degradation discrimination system for an internal combustion engine exhaust gas purification system according to the third embodiment can further enhance the degradation discrimination accuracy. The rest of the configuration as well as the effects and advantages thereof is the same as the first embodiment.

Figure 38:
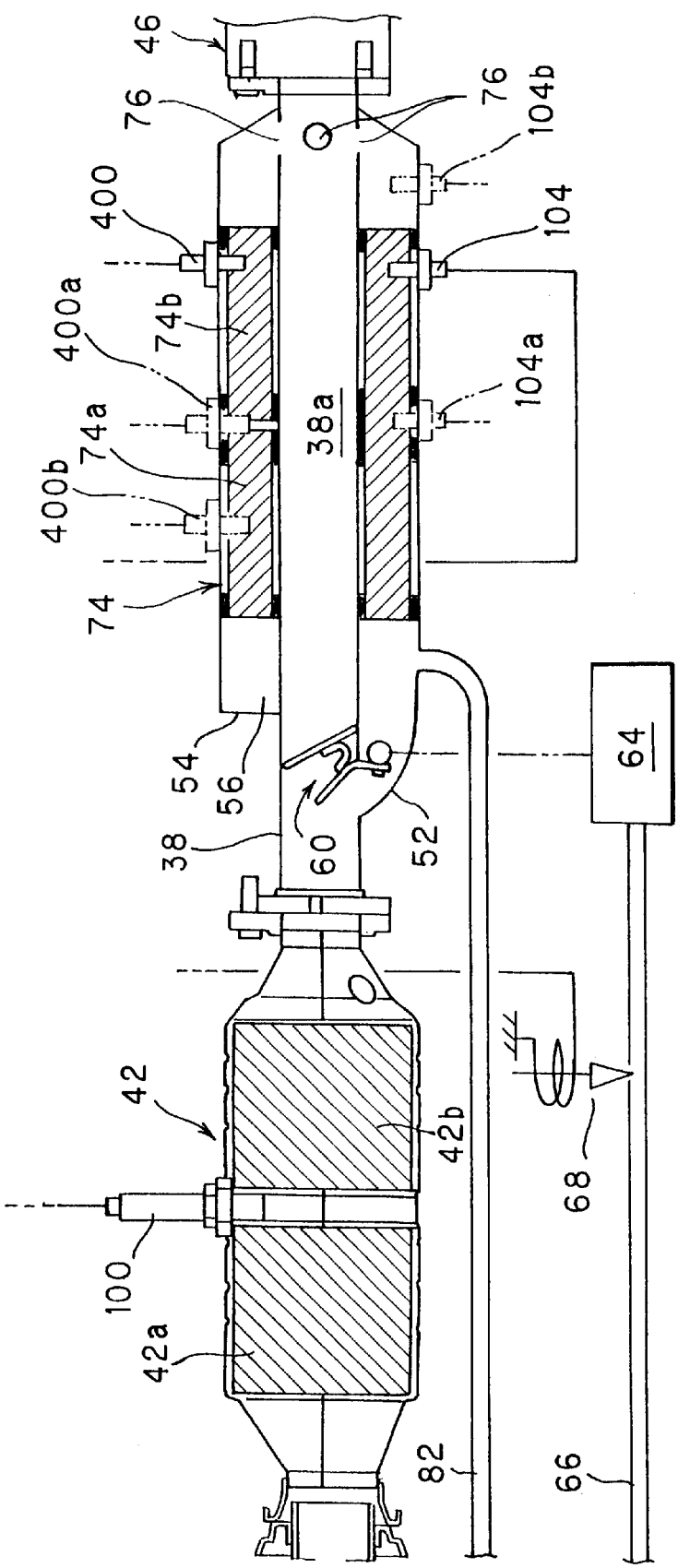
FIG. 38 is a view, partially similar to FIG. 1, but showing the configuration of the degradation discrimination system of an internal combustion engine exhaust gas purification system according to a fourth embodiment of this invention.

FIG. 38 is a cross sectional view of the portion downstream of the first and second catalysts 40, 42 showing a partial configuration of a degradation discrimination system of an internal combustion engine exhaust gas purification system according to a fourth embodiment of the invention.

In the fourth embodiment, as illustrated in the figure, in addition to the HC sensor 104, a temperature sensor (adsorbent temperature sensor) 400 is installed at the adsorbent 74, more precisely at the rear end (closer to the vehicle rear assembly 46) of the second adsorbent bed 74b. The temperature sensor 400 generates a signal indicative of the temperature of the adsorbent 74.

It is alternatively possible to install the temperature sensor 400 at a position between the first adsorbent bed 74a and the second adsorbent bed 74b as shown by phantom lines in the figure with the reference numeral 400a or at the first adsorbent bed 74a as shown by phantom lines with the reference numeral 400b.

Explaining this with focus on the differences from the first embodiment, in the determination of the estimated temperatures in a flow chart (not shown) to FIGS. 12 and 13, the result in a step similar to S118 is affirmative and the program proceeds to a step similar to S140 in which it is determined whether the adsorbent temperature sensor 400 is active.

When the result is negative, the program proceeds to a step similar to S120 in the same manner in the first embodiment. On the other hand, when the result is affirmative, the program proceeds to a step similar to S142 in which the output indicative of tmp.trs of the adsorbent temperature sensor 400 is read.

In the fourth embodiment, thus, when the adsorbent temperature sensor 400 has been activated, the sensor output is immediately read as the catalyst temperature tmp.trs, which is used, instead of the estimated value, in steps including that similar to S500 in the flow chart of FIG. 29.

Having been configured in such a manner, the degradation discrimination system for an internal combustion engine exhaust gas purification system according to the fourth embodiment can further enhance the degradation discrimination accuracy. The rest of the configuration as well as the effects and advantages thereof is the same as the first embodiment.

The first to fourth embodiments are thus configured to have a system for discriminating degradation of an exhaust purification system of an internal combustion engine (10) having an adsorbent (74) installed at a bypass exhaust gas passage (56) branched from an exhaust pipe (8) of the engine and merged into the exhaust pipe at a location downstream of the adsorbent, the bypass exhaust gas passage being opened by a switch-over valve (60) at starting of the engine to introduce the exhaust gas such that the adsorbent adsorbs unburned HC in exhaust gas generated by the engine and being closed such that the adsorbent desorbs the adsorbed HC and the desorbed HC is thereafter recirculated at a position upstream of a catalyst (40, 42), comprising: an HC sensor (104, 104a, 104b, ECU 114, S10) installed in the bypass exhaust gas passage at least one of a first position at the adsorbent and a second position downstream of the adsorbent for detecting concentration of HC (trs.hc) introduced in the pass exhaust gas passage in an adsorption mode where the adsorbent adsorbs HC; and adsorbent degradation discriminating means (ECU 114, S38, S600 to S608) for comparing the detected concentration of HC with a threshold value (trs.hc.agd) and for discriminating whether the adsorbent has degraded based on a result of the comparison.

In the system, the adsorbent degradation discriminating means includes: engine operating condition detecting means (crank angle sensor 90, manifold absolute pressure sensor 94, coolant temperature sensor 96, ECU 114) for detecting operating conditions of the engine; estimated in-exhaust gas HC concentration determining means (ECU 114, S12, S200 to S206) for determining an estimated in-exhaust gas HC concentration (ex.hc) indicative of an estimated HC concentration in the exhaust gas based at least on an engine speed and an engine load of the detected engine operating conditions and the detected concentration of HC; and threshold value determining means (ECU 114, S506 to S508) for determining the threshold value based at least on the determined estimated in-exhaust gas HC concentration.

In the system, the adsorbent degradation discriminating means includes: exhaust gas volume determining means (ECU 114, S26, S400) for determining a volume of the exhaust gas (trs.sv) flowing in the bypass exhaust gas passage and into the adsorbent based at least on the engine speed (NE) and the engine load (PBA) of the detected engine operating conditions; estimated adsorbed HC amount determining means for determining an estimated amount of HC (hcm.hat) adsorbed by the adsorbent; and HC adsorption rate determining means (ECU 114, S500 to S504) for determining an HC adsorption rate (ita.trs) of the adsorbent based at least on the determined estimated adsorbed HC amount; and the threshold value determining means determines the threshold value based at least on the estimated HC adsorption amount and the estimated in-exhaust gas HC concentration.

In the system, the HC adsorption rate determining means determines the HC adsorption rate based on the estimated adsorbed HC amount (hcm.hat) and a parameter relating to a temperature of the adsorbent. The parameter is at least one from among the temperature of the adsorbent (tmp.trs), a coolant temperature of the engine (TW), a temperature of the catalyst (tmp.cat) and a temperature at a location downstream of the catalyst (tmp.acat). The parameter is an estimated parameter or a measured parameter obtained by a temperature sensor (200, 300, 400).

In the system, the HC adsorption rate determining means includes: correction coefficient calculating means (ECU 114, S502) for calculating a correction coefficient (kita.trs) based on a time since starting of the engine (tm.trs); and corrects the HC adsorption rate based on the determined correction coefficient.

In the system, the adsorbent degradation discriminating means includes: degradation discrimination period determining means (ECU 114, S16) for determining a period for degradation discrimination (tm.trs.ch1, 2) based at least on a parameter relating to a temperature of the adsorbent, more precisely, based at least on the parameter and the estimated adsorbed HC amount (hcm.hat); and in-period determining means (ECU 114, S36, S38) for determining whether it is within the period; and discriminates whether the adsorbent has degraded when it is within the period.

In the system, the threshold value determining means determines the threshold value based at least on a parameter relating to a temperature of the adsorbent (ECU 114, S34, S500 to S508).

In the system, the adsorbent degradation discriminating means lights a warning lamp (144) when the adsorbent is discriminated to be degraded (ECU 114, S606).

It should be noted in the above that, although the manifold absolute pressure PBA is used as the value indicative of the engine load, it is alternatively possible to use the air flow rate or the throttle opening.

It should also be noted that the switch-over valve may be opened or closed by an electric actuator.

It should further be noted that the adsorbent should not be limited to the type disclosed, any other type may be used if it has an excellent heat-proof property.

While the invention has thus been shown and described with reference to specific embodiments, it should be noted that the invention is in no way limited to the details of the described arrangements, changes and modifications may be made without departing from the scope of the appended claims.

What is claimed is:

1. A system for discriminating degradation of an exhaust purification system of an internal combustion engine having an adsorbent installed at a bypass exhaust gas passage branched from an exhaust pipe of the engine and merged into the exhaust pipe at a location downstream of the adsorbent, the bypass exhaust gas passage being opened by a switch-over valve at starting of the engine to introduce the exhaust gas such that the adsorbent adsorbs unburned HC in exhaust gas generated by the engine and being closed such that the adsorbent desorbs the adsorbed HC and the desorbed HC is thereafter recirculated at a position upstream of a catalyst, comprising:

an HC sensor installed in the bypass exhaust gas passage at least one of a first position at the adsorbent and a second position downstream of the adsorbent for detecting concentration of HC introduced in the bypass exhaust gas passage in an adsorption mode where the adsorbent adsorbs HC; and adsorbent degradation discriminating means for comparing the detected concentration of HC with a threshold value and for discriminating whether the adsorbent has degraded based on a result of comparison.

2. A system according to claim 1, wherein the adsorbent degradation discriminating means includes:

engine operating condition detecting means for detecting operating conditions of the engine;

estimated in-exhaust gas HC concentration determining means for determining an estimated in-exhaust gas HC concentration indicative of an estimated HC concentration in the exhaust gas based at least on an engine speed and an engine load of the detected engine operating conditions and the detected concentration of HC; and threshold value determining means for determining the threshold value based at least on the determined estimated in-exhaust gas HC concentration.

3. A system according to claim 2, wherein the adsorbent degradation discriminating means includes:
   exhaust gas volume determining means for determining a volume of the exhaust gas flowing in the bypass exhaust gas passage and into the adsorbent based at least on the engine speed and the engine load of the detected engine operating conditions;
   estimated adsorbed HC amount determining means for determining an estimated amount of HC adsorbed to the adsorbent; and
   HC adsorption rate determining means for determining an HC adsorption rate of the adsorbent based at least on the determined estimated adsorbed HC amount;
   and the threshold value determining means determines the threshold value based at least on the estimated HC adsorption amount and the estimated in-exhaust gas HC concentration.

4. A system according to claim 3, wherein the HC adsorption rate determining means determines the HC adsorption rate based on the estimated adsorbed HC amount and a parameter relating to a temperature of the adsorbent.

5. A system according to claim 4, wherein the parameter is at least one from among the temperature of the adsorbent, a coolant temperature of the engine, a temperature of the catalyst and a temperature at a location downstream of the catalyst.

6. A system according to claim 5, wherein the parameter is an estimated parameter.

7. A system according to claim 5, wherein the parameter is a measured parameter obtained by a temperature sensor.

8. A system according to claim 3, wherein the HC adsorption rate determining means includes:
   correction coefficient calculating means for calculating a correction coefficient based on a time since starting of the engine;
   and correcting the HC adsorption rate based on the determined correction coefficient.

9. A system according to claim 8, wherein the HC adsorption rate determining means includes:
   correction coefficient calculating means for calculating a correction coefficient based on a time since starting of the engine;
   and correcting the HC adsorption rate based on the determined correction coefficient.

10. A system according to claim 2, wherein the adsorbent degradation discriminating means includes:
    degradation discrimination period determining means for determining a period for degradation discrimination based at least on a parameter relating to a temperature of the adsorbent; and
    in-period determining means for determining whether it is within the period;
    and discriminating whether the adsorbent has degraded when it is within the period.

11. A system according to claim 10, wherein the parameter is at least one from among the temperature of the adsorbent, a coolant temperature of the engine, a temperature of the catalyst and a temperature at a location downstream of the catalyst.

12. A system according to claim 11, wherein the parameter is an estimated parameter.

13. A system according to claim 11, wherein the parameter is a measured parameter obtained by a temperature sensor.

14. A system according to claim 2, wherein the threshold value determining means determines the threshold value based at least on a parameter relating to a temperature of the adsorbent.

15. A system according to claim 14, wherein the parameter is at least one from among the temperature of the adsorbent, a coolant temperature of the engine, a temperature of the catalyst and a temperature at a location downstream of the catalyst.

16. A system according to claim 15, wherein the parameter is an estimated parameter.

17. A system according to claim 15, wherein the parameter is a measured parameter obtained by a temperature sensor.

18. A system according to claim 1, wherein the adsorbent degradation discriminating means lights a warning lamp when the adsorbent is discriminated to be degraded.

19. A method of discriminating degradation of an exhaust purification system of an internal combustion engine having an adsorbent installed at a bypass exhaust gas passage branched from an exhaust pipe of the engine and merged into the exhaust pipe at a location downstream of the adsorbent, the bypass exhaust gas passage being opened by a switch-over valve at starting of the engine to introduce the exhaust gas such that the adsorbent adsorbs unburned HC in exhaust gas generated by the engine and being closed such that the adsorbent desorbs the absorbed HC and the desorbed HC is thereafter recirculated at a position upstream of a catalyst, comprising the steps of:
    detecting concentration of HC introduced in the bypass exhaust gas passage in an adsorption mode where the adsorpent adsorbs HC;
    comparing the detected concentration of HC with a threshold value and for discriminating whether the adsorbent has degraded based on a result of the comparison;
    wherein the step of adsorbent degradation discriminating includes the steps of:
      detecting operating conditions of the engine;
      determining an estimated in-exhaust gas HC concentration indicative of an estimated HC concentration in the exhaust gas based at least on an engine speed and an engine load of the detected engine operating conditions and the detected concentration of HC;
      determining the threshold value based at least on the determined estimated in-exhaust gas HC concentration;
      determining a volume of the exhaust gas flowing in the bypass exhaust gas passage and into the adsorbent based at least on the engine speed and the engine load of the detected engine operating conditions;
      determining an estimated amount of HC adsorbed to the adsorbent; and
      determining an HC adsorption rate of the adsorbent based at least on the determined estimated adsorbed HC amount; and the step of threshold value determining determines the threshold value based at least on the estimated HC adsorption amount and the estimated in-exhaust gas HC concentration.

20. A method according to claim 19, wherein the step of HC adsorption rate determining determines the HC adsorption rate based on the estimated adsorbed HC amount and a parameter relating to a temperature of the adsorbent.

21. A method according to claim 20, wherein the parameter is at least one from among the temperature of the adsorbent, a coolant temperature of the engine, a temperature of the catalyst and a temperature at a location downstream of the catalyst.

22. A method according to claim 21, wherein the parameter is an estimated parameter.

23. A method according to claim 21, wherein the parameter is a measured parameter obtained by a temperature sensor.

24. A method according to claim 19, wherein the step of HC adsorption rate determining includes the step of:

calculating a correction coefficient based on a time since starting of the engine;

and correcting the HC adsorption rate based on the determined correction coefficient.

25. A method according to claim 24, wherein the step of HC adsorption rate determining includes:

correction coefficient calculating means for calculating a correction coefficient based on a time since starting of the engine;

and correcting the HC adsorption rate based on the determined correction coefficient.

* * * * *